(12) United States Patent
Kadono

(10) Patent No.: US 6,690,724 B1
(45) Date of Patent: Feb. 10, 2004

(54) IMAGE PROCESSING METHOD, IMAGE PROCESSING DEVICE, AND DATA RECORDING MEDIUM

(75) Inventor: Shinya Kadono, Kobe (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/341,472
(22) PCT Filed: Jan. 9, 1998
(86) PCT No.: PCT/JP98/00040
§ 371 (c)(1), (2), (4) Date: Aug. 17, 1999
(87) PCT Pub. No.: WO98/31151
PCT Pub. Date: Jul. 16, 1998

(30) Foreign Application Priority Data

Jan. 10, 1997 (JP) .................................. 9-2659

(51) Int. Cl.⁷ ................................. H04B 1/66
(52) U.S. Cl. ................................. 375/240.01
(58) Field of Search .................. 348/408.1, 407.1, 348/405.1, 398.1, 397.1; 382/240, 238, 243; 375/240.01, 240.11, 240.14, 240.08, 240.24

(56) References Cited

U.S. PATENT DOCUMENTS

| | | | |
|---|---|---|---|
| 5,410,307 A | * | 4/1995 | Hekstra et al. ............... 341/50 |
| 5,418,570 A |   | 5/1995 | Ueno et al. |
| 5,485,279 A | * | 1/1996 | Yonemitsu et al. .......... 348/411 |
| 5,798,796 A | * | 8/1998 | Sugiyama .................... 348/405 |
| 5,963,257 A | * | 10/1999 | Katata et al. ........... 375/240.11 |
| 6,295,381 B1 | * | 9/2001 | Katata et al. ................ 382/240 |
| 6,466,697 B1 | * | 10/2002 | Boon .......................... 382/233 |

FOREIGN PATENT DOCUMENTS

| | | |
|---|---|---|
| JP | 6-78292 | 3/1994 |
| JP | 7-212761 | 8/1995 |

\* cited by examiner

*Primary Examiner*—Chris Kelley
*Assistant Examiner*—Behrooz Senfi
(74) *Attorney, Agent, or Firm*—Wenderoth, Lind & Ponack, L.L.P.

(57) ABSTRACT

A hierarchical image coding apparatus of the present invention, as shown in FIG. 1, comprises a subsampling unit for subsampling a high-resolution image signal Hg as an input image signal to produce a low-resolution image signal LSg, a low-resolution coding section for sequentially coding the low-resolution image signal LSg for each block comprising a plurality of pixels, and a high-resolution coding section for sequentially coding the high-resolution image signal for each block comprising a plurality of pixels, wherein the high-resolution image signal HSg is coded by referring to the low-resolution image signal LSg corresponding to a reference low-resolution block located at the same spatial position as a target high-resolution block to be coded. In the hierarchical image coding apparatus so constructed, an image signal including shape information of an object can be hierarchically coded without degrading coding efficiency.

24 Claims, 22 Drawing Sheets

Fig.12 (a)

| 10 | 10 | 10 | 10 |
|----|----|----|----|
| 10 | 1  | 10 | 10 |
| 10 | 10 | 10 | 10 |

LR, LMB

Fig.12 (b)

| 10 | 10 | 10 | 10 |
|----|----|----|----|
| 10 | 1  | 10 | 10 |
| 10 | 10 | 10 | 10 |

HR, HMB1

Fig.12 (c)

| 10 | 10 | 10 | 10 |
|----|----|----|----|
| 10 | 1  | 10 | 10 |
| 10 | 10 | 10 | 10 |

AR, AMB

Fig.12 (d)

| 0  | 10 | 10 | 10 | 10 | 0  | 10 | 0 |
|----|----|----|----|----|----|----|---|
| 10 | 10 | 1  | 1  | 10 | 10 | 10 | 0 |
| 10 | 1  | 1  | 1  | 1  | 10 | 10 | 0 |
| 10 | 1  | 1  | 1  | 1  | 10 | 10 | 0 |
| 10 | 10 | 1  | 1  | 10 | 10 | 10 | 0 |
| 0  | 10 | 10 | 10 | 10 | 0  | 0  | 0 |

HR, HMB2 low-resolution rectangular region LR

LMV high-resolution rectangular region HR

HMV1  HMV2

HMV3 interpolated rectangular region AR

AMV high-resolution rectangular region HR block to be coded Bx

IMAGE PROCESSING METHOD, IMAGE PROCESSING DEVICE, AND DATA RECORDING MEDIUM

TECHNICAL FIELD

The present invention relates to an image processing method, an image processing apparatus, and a data recording medium and, more particularly to hierarchical coding and hierarchical decoding wherein an image signal is recorded or transmitted with fewer bits without degrading an image quality, and a recording medium which stores a program for implementing the hierarchical coding or the hierarchical decoding.

BACKGROUND ART

In order to perform image processing for each object displayed on a display image, a shape signal indicating a shape of an object as well as a luminance signal and a chrominance signal is necessary as an image signal. In description below, the image signal comprising the shape signal, i.e., shape information of the object, as well as the luminance signal and the chrominance signal is referred to as the "image signal".

This image signal is suitable for use in multimedia in which image information, audio information and so forth are related to each other simultaneously, since it can be handled for each object. Techniques for coding the image signal is currently standardized by MPEG (Moving Picture Experts Group) 4 as ISO/IEC (International Organization for Standardization/International Electrotechnical Commission Joint Technical Commission) group.

A prior art hierarchical coding of the image signal will now be described.

FIG. 22 shows display images (hereinafter referred to as "frames") corresponding to image signals of different resolutions, respectively. In FIG. 22(a), LF indicates a display image of a low-resolution image signal and in FIG. 22(b), HF indicates a display image of a high-resolution image signal. Lob represents an image of an object of the low-resolution image signal which is displayed on the frame LF. Hob indicates an image of an object of the high-resolution signal which is displayed on the frame HF. In these Figures, an inner portion of each object is represented by dots.

In the prior art image coding (state of the art evaluation model system according to MPEG 4), a rectangular region including an object is set on a frame for each object and the rectangular region is divided into blocks (square blocks MB each comprising (16×16) pixels in the evaluation model according to MPEG 4). The image signal corresponding to each object is coded for each of the blocks composing the rectangular region.

Hence, in the hierarchical coding according to MPEG4, a low-resolution rectangular region LR is set for an object Lob on a low-resolution frame LF as shown in FIG. 22(c) and a high-resolution rectangular region HR is set for an object Hob on a high-resolution frame HF as shown in FIG. 22(d).

In this hierarchical coding, the rectangular region LR for the low-resolution image signal and the rectangular region HR for the high-resolution image signal are respectively and independently set. As a result, in some cases, although coding itself is performed with ease, spatial positions of respective blocks of each object (positions of respective blocks on the frame) do not match between blocks in the low-resolution rectangular region and blocks in the high-resolution rectangular region and therefore, correspondence does not exist between them.

Hereinafter, this will be described in detail. FIG. 23 is a block diagram showing a prior art hierarchical image coding apparatus.

A prior art image coding apparatus 200a is adapted to receive an input image signal and perform hierarchical coding to the input image signal as a high-resolution image signals HSg. To be specific, the hierarchical image coding apparatus 200a comprises a subsampling unit 2 for subsampling the high-resolution image signal HSg to produce a low-resolution image signal LSg, and a low-resolution coding section 201L for performing coding to the low-resolution image signal LSg to produce a low-resolution coded signal LEg. The apparatus 200a further comprises a decoder 9a for decoding the low-resolution coded signal LEg, an upsampling unit 10a for upsampling an output Ldg of the decoder 9a, and a high-resolution coding section 201H for performing coding to the high-resolution image signal HSg on the basis of an output LAg of the upsampling unit 10a and outputting a high-resolution signal HEg.

The low-resolution coding section 201L includes a region detecting unit 3 for detecting information such as a position or a size of the low-resolution rectangular region LR for each object on the low-resolution frame LF on the basis of the low-resolution image signal LSg and outputting the information as a signal LRg, and a region extracting unit 5 for extracting an image signal LOg (image signal corresponding to a region) of the rectangular region LR from the low-resolution image signal LSg according to the signal LRg. The coding section 201L further includes a blocking unit 6 for dividing the image signal LOg of the rectangular region LR into image signals respectively corresponding to blocks MB each comprising (16×16) pixels into which the rectangular region is divided, and outputting image signals (blocked image signals) LBg for each block, and an encoder 7 for encoding the blocked image signal LBg and outputting a low-resolution coded signal LEg.

The high-resolution coding section 201H includes a region detecting unit 12 for detecting information such as a position or a size of the rectangular region HR for each object on the high-resolution frame HF on the basis of the high-resolution image signal HSg and outputting the information as a signal HRg and an region extracting unit 14 for extracting an image signal HOg of the rectangular region HR from the high-resolution image signal HSg according to the signal HRg. The coding section 201H further includes a blocking unit 15 for dividing the image signal (image signal corresponding to a region) HOg of the rectangular region HR into image signals respectively corresponding to blocks MB each comprising (16×16) pixels into which the rectangular region is divided, and outputting image signals (blocked image signals) HBg for each block, and an encoder 16 for encoding the blocked image signal HBg and outputting a high-resolution coded signal HEg.

Subsequently, operation will be described.

When the high-resolution image signal HSg is input to the image coding apparatus 200a as the input image signal, the signal HSg is subjected to subsampling and converted into the low-resolution image signal LSg by the subsampling unit 2.

The region detecting unit 3 of the low-resolution coding section 201L detects a range of the rectangular region LR including the object Lob to be processed on the low-resolution frame FL shown in FIG. 22(c) on the basis of the low-resolution image signal LSg and outputs the information such as a position or a size of the rectangular region as the signal LRg. The region extracting unit 5 extracts the object image signal LOg of the rectangular region LR from the low-resolution image signal LSg according to the signal LRg. The blocking unit 6 divides the object image signal LOg into image signals respectively corresponding to plural blocks MB into which the low-resolution rectangular region LR is divided, and outputs blocked image signals LBg corresponding to respective blocks to the encoder 7. The encoder 7 encodes the blocked image signal LBg, and the low-resolution coded signal LEg is output from the coding section 201L.

The low-resolution coded signal LEg is decoded by the decoder 9a and converted into a low-resolution decoded signal Ldg, which is interpolated and converted into an interpolated decoded signal LAg with the same spatial resolution as the high-resolution image signal and output to the encoder 16 in the high-resolution coding section 201H.

Concurrently with this operation, the high-resolution coding section 201H operates like the low-resolution coding section 201L.

To be specific, the region detecting unit 12 detects a range of the rectangular region HR including an object Hob to be processed on the high-resolution frame HF shown in FIG. 22(*d*) on the basis of the high-resolution image signals HSg and outputs the information such as a position and a size of the rectangular region HR as the signal HRg. The region extracting unit 14 extracts the object image signal HOg of the rectangular region HR from the high-resolution image signal HSg according to the signal HRg. The blocking unit 15 divides the object image signal HOg into image signals respectively corresponding to plural blocks MB into which the high-resolution rectangular region HR is divided, and outputs blocked image signals HBg to the encoder 16 for each block. The encoder 16 encodes the blocked image signal HBg on the basis of the interpolated decoded signal LAg, and the high-resolution coded signal HEg is output from the coding section 201H.

The low-resolution coded signal LEg thus coded by the hierarchical image coding apparatus 200a is decoded to produce a decoded signal corresponding to the low-resolution image signal LSg on the basis of the signal LRg. Meanwhile, the high-resolution coded signal HEg thus coded by the coding apparatus 200a is decoded to produce a decoded signal corresponding to the high-resolution image signal HSg on the basis of the low-resolution coded signal LEg, the signal LRg, and the signal HRg. In addition, in coding of the high-resolution image signal HSg, by using correlation of pixel values between the image signals LSg and HSg, by referring to the low-resolution image signal LSg, it is possible to perform coding to the high-resolution image signal HSg with fewer bits as compared with a case where the high-resolution image signal HSg is independently coded.

FIG. 24 is a block diagram showing a prior art image decoding apparatus.

A hierarchical image decoding apparatus 200b is adapted to receive the low-resolution coded signal LEg and the high-resolution coded signal HEg which have been coded by the prior art image coding apparatus 200a in FIG. 23 and performs hierarchical decoding to the same.

To be specific, the hierarchical image decoding apparatus 200b comprises a low-resolution decoding section 202L for decoding the low-resolution coded signal LEg to produce a low-resolution reproduced signal LCg, an upsampling unit 10b for interpolating a signal LDg being decoded in the decoding section 202L by upsampling, and a high-resolution decoding section 202H for decoding the high-resolution coded signal HEg to produce a high-resolution reproduced signal HCg on the basis of an output ADg of the upsampling unit 10b.

The low-resolution decoding section 202L includes a decoder 9 for decoding the low-resolution coded signal LEg to produce a low-resolution decoded signal LDg for each block, an inverse blocking unit 20 for integrating the low-resolution decoded signals LDg to produce a integrated decoded signal LIg corresponding to the rectangular region LR, and a region composition unit 21 for compositing the integrated decoded signal LIg and the other image signals of one frame so that the rectangular region LR is disposed in the position of the low-resolution frame LF as indicated by the signal LRg from the coding apparatus 200a.

The high-resolution decoding section 202H includes a decoder 30 for decoding the high-resolution coded signal HEg to produce a high-resolution decoded signal HDg for each block on the basis of an output ADg of the upsampling unit 10b, an inverse blocking unit 31 for integrating the high-resolution decoded signals HDg to produce a integrated decoded signal HIg corresponding to the rectangular region HR, and a region composition unit 32 for compositing the integrated decoded signal HIg and the other image signal of one frame so that the rectangular region HR is disposed in the position of the frame HF as indicated by the signal HRg from the coding apparatus 200a.

Subsequently, operation will be described.

When the low-resolution coded signal LEg and the high-resolution coded image signal HEg are input to the image decoding apparatus 200b, the low-resolution coded signal LEg is decoded to produce the low-resolution decoded signal LDg by the decoder 9 in the low-resolution decoding section 202L. The low-resolution decoded signal LDg is upsampled for interpolation by the upsampling unit 10b and converted into the interpolated decoded signal ADg with a spatial resolution corresponding to the high resolution. The low-resolution decoded signals LDg are integrated by the inverse blocking unit 20 to produce the integrated decoded signal LIg of the rectangular region LR. The integrated decoded signal LIg is composited together with the other image signals of one frame by the region composition unit 21 according to the signal LRg from the coding apparatus 200a and output as the low-resolution reproduced signal LCg. After this composition, an image of the region LR represented by the integrated decoded signal LIg is disposed in the position of the frame LF as indicated by the signal LRg.

Meanwhile, the high-resolution coded signal HEg is decoded by the decoder 30 in the high-resolution decoding section 202H on the basis of the output ADg of the upsampling unit 10b to produce high-resolution decoded signal HDg. The high resolution decoded signals HDg are integrated by the inverse blocking unit 31 to produce the integrated decoded signal HIg corresponding to an image in the rectangular region HR. The integrated decoded signal HIg is composited together with the other image signals of one frame according to the signal HRg from the coding apparatus 200a by the region composition unit 32 and output as the high-resolution reproduced signal HCg. After this composition, an image in the rectangular region HR represented by the integrated decoded signal HIg is disposed on the frame HF as indicated by the signals HRg.

In the hierarchical image decoding apparatus 200b constructed above, after the low-resolution coded signal LEg is decoded and then inversely blocked, the low-resolution decoded signal LIg of the rectangular region LR is composited so that the rectangular region LR is disposed in a predetermined position of the frame LF. Thereby, it is possible to decode the low-resolution coded signal LEg resulting from coding for rectangular region LR including each object in the frame FL.

In addition, after the high-resolution coded signal HEg is decoded by referring to the low-resolution decoded signal LDg, to produce the high-resolution decoded signal HDg, the decoded signals HDg are inversely blocked and then the high-resolution decoded signal HIg of the rectangular region HR is composited so that the rectangular region HR is disposed in a predetermined position in the frame HF. Thereby, it is possible to correctly decode the high-resolution coded signal HEg resulting from hierarchical coding for the rectangular region HR including each object in the frame HF.

However, in the prior art hierarchical image coding apparatus 200a, the range of the rectangular region LR in the low-resolution frame LF and the range of the rectangular region HR in the high-resolution frame HF are respectively and independently detected. For this reason, as shown in FIGS. 22(c) and 22(d), a spatial position of the low-resolution image Lob in each block MB and a spatial position of the high-resolution image Hob in each block MB do not match. Therefore, when coding the high-resolution image signal Hog corresponding to the high resolution rectangular region HR for each block, it is difficult to establish correspondence between high-resolution blocks to be coded and low-resolution blocks, which causes complicated operation of a difference value between the high-resolution image signal and the low-resolution image signal. As a result, when coding the high-resolution blocks, prediction efficiency in hierarchical coding is degraded, and thereby coding efficiency is reduced, as compared with a case where the high-resolution blocks are coded by referring to the low-resolution blocks whose spatial positions perfectly match those of the high-resolution blocks to-be-coded.

The present invention is directed to solving the above problems and, it is an object of the present invention to provide an image processing method and an image processing apparatus which implement hierarchical coding in which coding of a high-resolution image signal with reference to a low-resolution image signal is carried out without degrading coding efficiency when performing hierarchical coding for a rectangular region including an object in a frame, and hierarchical decoding adapted to the hierarchical coding, and a data recording medium which contains a program for implementing the hierarchical coding and the hierarchical decoding by software.

DISCLOSURE OF THE INVENTION

According to a first aspect of the present invention, an image processing method for hierarchically coding an input image signal including shape information of the object, object by object which is included in an image, comprises: producing at least a low-resolution image signal and a high-resolution image signal as hierarchical image signals corresponding to an object, forming plural image spaces of different spatial resolutions, based on the input image signal; extracting a high-resolution region image signal corresponding to a region including the object which is to be coded in a high-resolution image space, from the high-resolution image signal corresponding to the object, dividing the region image signal into image signals respectively corresponding to high-resolution blocks each comprising a predetermined number of pixels, extracting a low-resolution region image signal corresponding to a region including the object which is to be coded in a low-resolution image space, from the low-resolution image signal corresponding to the object, and dividing the region image signal into image signals respectively corresponding to low-resolution blocks each comprising a predetermined number of pixels; and sequentially coding a high-resolution blocked image signal forming a target high-resolution block to be coded, by referring to a low-resolution blocked image signal forming a reference low-resolution block corresponding to the target high-resolution block, wherein a spatial position of the reference low-resolution block in the low-resolution image space corresponds to a spatial position of the target high-resolution block in the high-resolution image space according to a predetermined rule.

In the image processing method constructed above, the high-resolution image signal is coded by referring to the image signal of the low-resolution block located at the spatial position which correlates with the spatial position of the target high-resolution block to-be-coded. As a result, the image signal including shape information can be hierarchically coded without degrading coding efficiency.

According to a second aspect of the present invention, in the image processing method of the first aspect, each pixel in the high-resolution image space has a one-to-one correspondence with each pixel in a resolution-converted image space in which the low-resolution image space has been resolution-converted, the resolution-converted image space having the same spatial resolution as the high-resolution image space.

In the image processing method constructed above, all of plural pixels in the high-resolution block correspond to predetermined pixels in the resolution-converted block in which the low-resolution block has been resolution-converted. As a result, coding efficiency in the hierarchical coding process can be increased.

According to a third aspect of the present invention, in the image processing method of the first aspect, the number of pixels in the reference low-resolution block is equal to the number of pixels in the target high-resolution block.

In the image processing method constructed above, a blocking unit and an encoder are shared by the high-resolution image signal and the low-resolution image signal, whereby a compact circuit structure is realized.

According to a fourth aspect of the present invention, in the image processing method of the first aspect, the spatial position of the reference low-resolution block in the low-resolution image space relatively matches the spatial position of the target high-resolution block in the high-resolution image space.

In the image processing method constructed above, since the spatial position of the target high-resolution block matches the spatial position of the reference low-resolution block, difference between a pixel value of each pixel in the high-resolution block and a pixel value of each pixel in the low-resolution block is not large. As a result, the hierarchical coding process can be performed with higher coding efficiency.

According to a fifth aspect of the present invention, in the image processing method of the first aspect, a coding method for a mode signal indicating a coding mode for identifying the coding process for the target high-resolution block is changed according to a coding mode for identifying a coding process for the reference low-resolution block.

In the image processing method constructed above, a shorter code is assigned to the coding mode for the high-resolution block which matches the coding mode for the low-resolution block. Thereby, it is possible to reduce the number of bits to be coded in the process for coding the mode signal indicating the coding mode for the high-resolution image signal.

According to a sixth aspect of the present invention, in the image processing method of the fifth aspect, the coding mode indicates whether or not a boundary of a shape of an object displayed on an image space is included in the target high-resolution block.

In the image processing method constructed above, when the positional relationship between the high-resolution block and the object matches the positional relationship between the low-resolution block and the object, a shorter code is assigned to the mode signal indicating the coding mode for the high-resolution image signal. Thereby, it is possible to reduce the number of bits to be coded in the process for coding the mode signal.

According to a seventh aspect of the present invention, in the image processing method of the first aspect, a mode signal indicating a coding mode for identifying a coding process for the target high-resolution block is coded according to a coding mode for identifying a coding process for the reference low-resolution block, and the coding mode indicates that the coding process sequentially performed to the image signal of the reference low-resolution block for each pixel is performed in either horizontal or vertical scanning direction.

In the image processing method constructed above, the high-resolution image signal is coded in the scanning direction in which correlation between pixel values thereof is high, and therefore, when there is match between the scanning direction in which correlation between pixel values in the high-resolution image signal is high and the scanning direction in which correlation between pixel values in the low-resolution image signal is high, a shorter code is assigned to the mode signal indicating the coding mode for the high-resolution image signal. Thereby, it is possible to reduce the number of bits to be coded in the process for coding the mode signal.

According to an eighth aspect of the present invention, in the image processing method of the first aspect, a coding method for motion information of the target high-resolution block indicating motion of an object in the high-resolution image space is coded by referring to motion information of a reference low-resolution block indicating motion of an object in the low-resolution image space.

In the image processing method so constructed, since there is high correlation of pixel values between the high-resolution image signal and the low-resolution image signal, when a motion vector of the high-resolution block matches that of the corresponding low-resolution block, a shorter code is assigned to the mode signal indicating the motion vector (coding mode) of the high-resolution image signal. Thereby, it is possible to reduce the number of bits to be coded in the process for coding the motion vector.

According to a ninth aspect of the present invention, in the image processing method of the first aspect, a coding method for motion information of the target high-resolution block indicating motion of an object in the high-resolution image space is coded by referring to motion information of a coded high-resolution block indicating motion of an object in the high-resolution image space and motion information of the reference low-resolution block indicating motion of an object in the low-resolution image space.

In the image processing method constructed above, since the prediction vector is generated from the motion vector of the coded high-resolution block for the target high-resolution block and the motion vector of the low-resolution block for the target high-resolution block, and based on the prediction vector, the motion vector of the target high-resolution block is coded. Since there is correlation of pixel values between frames and there is high correlation of pixel values between the high-resolution image signal and the low-resolution image signal, the error between the motion vector of the target high-resolution block and the prediction motion vector is made smaller. As a result, it is possible to reduce the number of bits to be coded in the process for coding the motion vector of the high-resolution image signal.

According to a tenth aspect of the present invention, an image processing method for decoding at least two blocked and hierarchically coded signals corresponding to an object which are obtained by hierarchically coding an input image signal including shape information of the object, object by object which is included in an image, comprises: decoding a low-resolution coded signal corresponding to the object of the blocked and hierarchically coded signals to produce low-resolution decoded signals of low-resolution blocks each comprising a predetermined number of pixels in a low-resolution image space; integrating the low-resolution decoded signals to produce a low-resolution region image signal corresponding to a region including the object in the low-resolution image space; decoding a high-resolution coded signal corresponding to the object of the blocked and hierarchically coded signals by referring to a reference low-resolution decoded signal to produce high-resolution decoded signals of high-resolution blocks each comprising a predetermined number of pixels in a high-resolution image space; and integrating the high-resolution decoded signals to produce a high resolution region image signal corresponding to a region including the object in the high-resolution image space, wherein a spatial position of the reference low-resolution block in the low-resolution image space relatively corresponds to a spatial position of a target high-resolution block to be decoded in the high-resolution image space according to a predetermined rule.

In the image processing method constructed above, the high-resolution image signal is decoded by referring to the decoded signal of the low-resolution block located at the spatial position in the low-resolution image space which correlates with the spatial position of the target high-resolution block to-be-decoded. As a result, a hierarchical decoding process is carried out in a way adapted to the hierarchical coding process for the image signal including shape information of an object without degrading coding efficiency.

According to an eleventh aspect of the present invention, in the image processing method of the tenth aspect, each pixel in the high-resolution image space has a one-to-one correspondence with each pixel in a resolution-converted image space in which the low-resolution image space has been resolution-converted, the resolution-converted image space having the same spatial resolution as the high-resolution image space.

In the image processing method constructed above, all of plural pixels in the high-resolution block correspond to predetermined pixels in the resolution-converted block in which the low-resolution block has been resolution-converted. Thereby, a hierarchical decoding process is carried out in a way adapted to the high hierarchical coding process with high coding efficiency.

According to a twelfth aspect of the present invention, in the image processing method of the tenth aspect, the number of pixels in the reference low-resolution block is equal to the number of pixels in the target high-resolution block.

In the image processing method constructed above, a decoder and an inverse blocking unit are shared by the high-resolution coded signal and the low-resolution coded signal. As a result, a compact circuit structure is realized.

According to a thirteenth aspect of the present invention, in the image processing method of the tenth aspect, the spatial position of the reference low-resolution block in the low-resolution image space relatively matches the spatial position of the target high-resolution block in the high-resolution image space.

In the image processing method constructed above, a hierarchical decoding process is carried out in a way adapted to the hierarchical coding process with high coding efficiency, in which the spatial position of the target high-resolution block matches that of the reference low-resolution block, difference between a pixel value of each pixel in the high-resolution block and a pixel value of each pixel in the low-resolution block is not large.

According to a fourteenth aspect of the present invention, in the image processing method of the tenth aspect, a decoding method for a coded mode signal indicating a coding mode for identifying a decoding process for the target high-resolution block is changed according to a coding mode for identifying a decoding process for the reference low-resolution block.

In the image processing method constructed above, a hierarchical decoding process is performed in a way adapted to the coding process in which a shorter code is assigned to the mode signal indicating the coding mode for the high-resolution block which matches the coding mode for the low-resolution block, and thereby, it is possible to reduce the number of bits to be coded in the process for coding the mode signal indicating the coding mode for the high-resolution image signal.

According to a fifteenth aspect of the present invention, in the image processing method of the tenth aspect, wherein a coded mode signal indicating a coding mode for identifying a decoding process for the target high-resolution block is decoded according to a coding mode for identifying a decoding process for the reference low-resolution block, and the coding mode indicates whether or not a boundary of a shape of an object displayed on an image space is included in the target high-resolution block.

In the image processing method constructed above, a hierarchical decoding process is carried out in a way adapted to the hierarchical coding process, in which when the positional relationship between the high-resolution block and the object matches the positional relationship between the low-resolution block and the object, a shorter code is assigned to the mode signal indicating the coding mode for the high-resolution image signal, and thereby it is possible to reduce the number of bits to be coded.

According to a sixteenth aspect of the present invention, in the image processing method of the tenth aspect, wherein a coded mode signal indicating a coding mode for identifying a decoding process for the target high-resolution block is decoded according to a coding mode for identifying a decoding process for the reference low-resolution block, and the coding mode indicates that the decoding process sequentially performed to the low-resolution coded signal of the reference low-resolution block for each pixel is performed in either horizontal or vertical scanning direction.

In the image processing method constructed above, a decoding process is carried out in a way adapted to the hierarchical coding process, in which when there is match between the scanning direction in which correlation between pixel values in the high-resolution image signal is high and the scanning direction in which correlation between pixel values in the low-resolution image signal is high, a shorter code is assigned to the mode signal indicating the coding mode for the high-resolution image signal, and thereby it is possible to reduce the number of bits to be coded.

According to a seventeenth aspect of the present invention, in the image processing method of the tenth aspect, motion information of the target high-resolution block indicating motion of an object in the high-resolution image space is decoded according to motion information of the reference low-resolution block indicating motion of an object in the low-resolution image space.

In the image processing method so constructed, a hierarchical decoding process is carried out in a way adapted to the hierarchical coding process, in which, when a motion vector of the high-resolution block matches that of the corresponding low-resolution block, a shorter code is assigned to the mode signal indicating the motion vector (coding mode) of the high-resolution image signal, and thereby it is possible to reduce the number of bits to be coded.

According to an eighteenth aspect of the present invention, in the image processing method of the tenth aspect, motion information of the target high-resolution block indicating motion of an object in the high-resolution image space is decoded according to motion information of a decoded high-resolution block indicating motion of an object in the high-resolution image space and motion information of the reference low-resolution block indicating motion of an object in the low-resolution image space.

In the image processing method constructed above, a hierarchical decoding process is carried out in a way adapted to the hierarchical coding process, in which the error between the motion vector of the target high-resolution block and the prediction motion vector is made smaller, and thereby, it is possible to reduce the number of bits to be coded.

According to a nineteenth aspect of the present invention, an image processing apparatus for hierarchically coding an input image signal including shape information of an object, object by object which is included in an image, comprises: a subsampling means for subsampling the input image signal to produce a low-resolution image signal; a first region extraction means for producing a low-resolution region image signal corresponding to a region including the object which is to be coded in the low-resolution image space, from the low-resolution image signal; a first blocking means for performing a blocking process in such a way that the low-resolution region image signal is divided into signals respectively corresponding to low-resolution blocks each comprising a predetermined number of pixels and outputting low-resolution blocked image signals; a first encoding means for sequentially coding a low-resolution blocked image signal forming a low-resolution block to be coded; a second region extraction means for producing a high-resolution region image signal corresponding to a region including the object which is to be coded in the high-resolution image space, from the high-resolution image signal as the input image signal; a second blocking means for performing a blocking process in such a way that the high-resolution region image signal is divided into signals respectively corresponding to high-resolution blocks each comprising a predetermined number of pixels and outputting high-resolution blocked image signal; and a second encoding means for sequentially coding a high-resolution blocked image signal forming a target high-resolution block to be coded, by referring to a low-resolution blocked image signal forming a reference low-resolution block corresponding to the target high-resolution block, wherein a spatial position of the reference low-resolution block in the low-resolution image space relatively corresponds to a spatial position of the target high-resolution block in the high-resolution image space according to a predetermined rule.

In the image processing apparatus constructed above, the high-resolution image signal is coded by referring to the image signal of the low-resolution block located at the spatial position which correlates with the spatial position of the target high-resolution block to-be-coded. As a result, the image signal including shape information can be hierarchically coded without degrading coding efficiency.

According to a twentieth aspect of the present invention, an image processing apparatus for decoding at least two blocked and hierarchically coded signals corresponding to an object which are obtained by hierarchically coding an input image signal including shape information of the object, object by object which is included in an image, comprises: a first decoding means for decoding a low-resolution coded signal corresponding to an object of the blocked and hierarchically coded signals to produce low-resolution decoded signals of low-resolution blocks each comprising a predetermined number of pixels in a low-resolution image space; a first inverse blocking means for integrating the low-resolution decoded signals of the low-resolution blocks to produce a low-resolution region image signal corresponding to a region including the object in the low-resolution image space; a second decoding means for decoding a high-resolution coded signal corresponding to the object of the blocked and hierarchically coded signals, by referring to a reference low-resolution decoded signal, to produce high-resolution decoded signals of high-resolution blocks each comprising a predetermined number of pixels in a high-resolution image space; and a second inverse blocking means for integrating the high-resolution decoded signals of the high-resolution blocks to produce a high-resolution region image signal corresponding to a region including the object in the high-resolution image space, wherein, a spatial position of the reference low-resolution block in the low-resolution image space, relatively corresponds to a spatial position of the target high-resolution block in the high-resolution image space according to a predetermined rule.

In the image processing apparatus constructed above, the high-resolution image signal is decoded by referring to the decoded image signal of the low-resolution block located at the spatial position in the low-resolution image space, which correlates with the spatial position of the target high-resolution block to be decoded, and thereby the hierarchical decoding process is carried out in a way adapted to the hierarchical coding process for the image signal including shape information of an object with degradation of coding efficiency suppressed.

According to a twenty-first aspect of the present invention, in a data recording medium for storing a program which makes a computer perform a hierarchical image coding process, the program makes the computer perform a hierarchical image coding process according to an image processing method of the first aspect.

In the data recording medium constructed above, use of the computer realizes the hierarchical coding process, in which the high-resolution image signal is coded by referring to the image signal of the low-resolution block located at the spatial position which correlates with the spatial position of the target high-resolution block to-be-coded, and thereby, the image signal including shape information can be hierarchically coded without degrading coding efficiency.

According to a twenty-second aspect of the present invention, a data recording medium for storing a program which makes a computer perform a hierarchical image decoding process, the program makes the computer perform a hierarchical image decoding process according to an image processing method of the tenth aspect.

In the data recording medium constructed above, use of the computer realizes the hierarchical decoding process, in which the high-resolution image signal is decoded by referring to the decoded image signal of the low-resolution block located at the spatial position which correlates with the spatial position of the target high-resolution block to-be-decoded, and thereby, the hierarchical decoding process adapted to the hierarchical coding process for the image signal including shape information of an object with degradation of coding efficiency suppressed.

BRIEF DESCRIPTION OF THE DRAWINGS

FIGS. 12(a) to 12(d) are diagrams for explaining operation of the hierarchical image coding apparatus of the eighth embodiment.

BEST MODE FOR CARRYING OUT THE INVENTION

Preferred embodiments will now be described with reference to FIGS. 1 through 21.

EMBODIMENT 1

Figure 1:
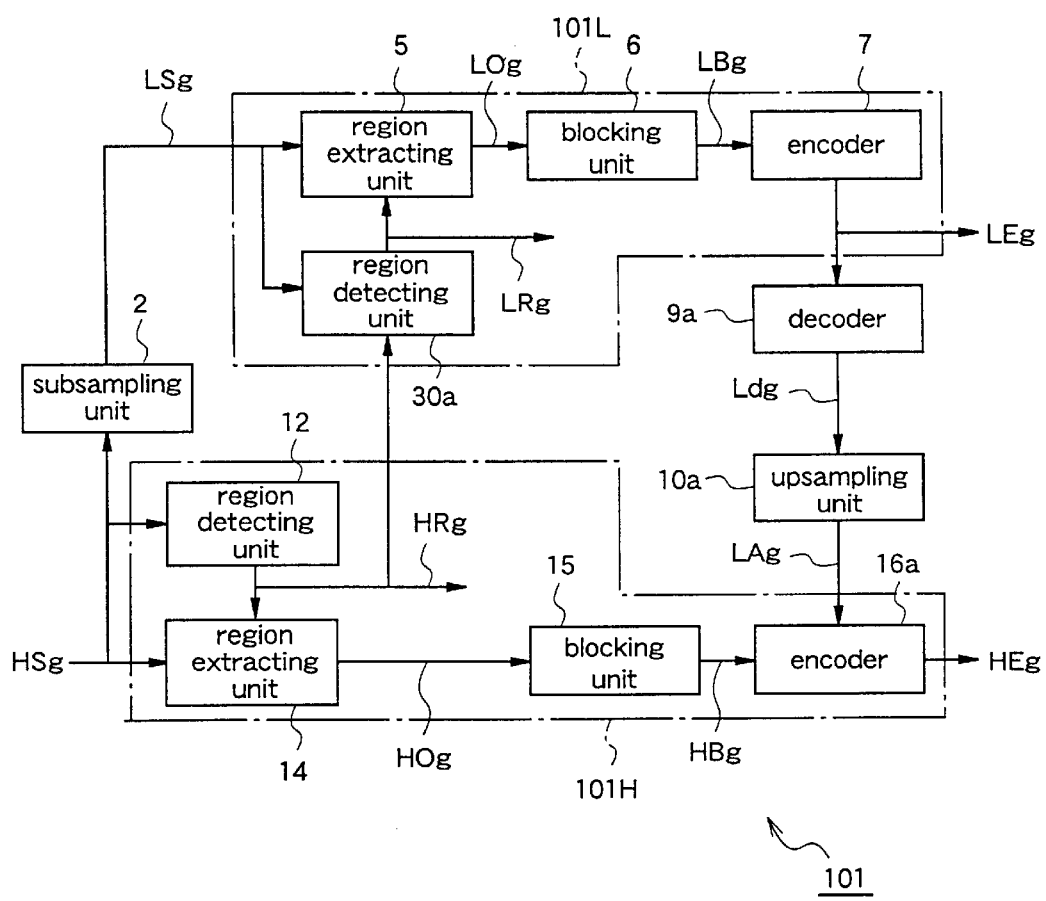
FIG. 1 is a block diagram for explaining a hierarchical image coding apparatus as an image processing apparatus according to a first embodiment of the present invention.
Figure 2:
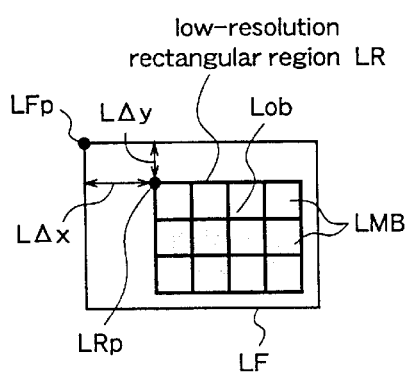
FIGS. 2(a) to 2(d) are diagrams for explaining operation of the hierarchical image coding apparatus of the first embodiment.
Figure 2:
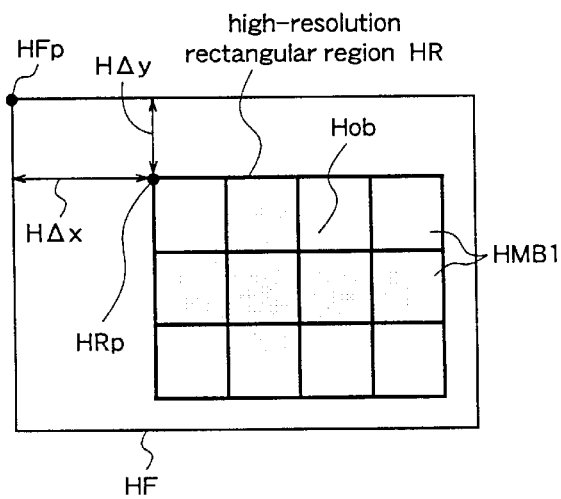
Figure 2:
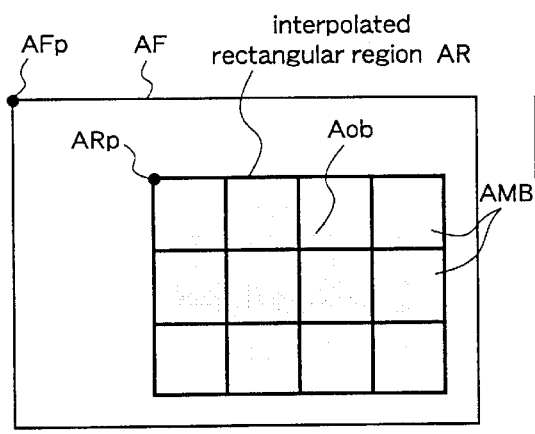
Figure 2:
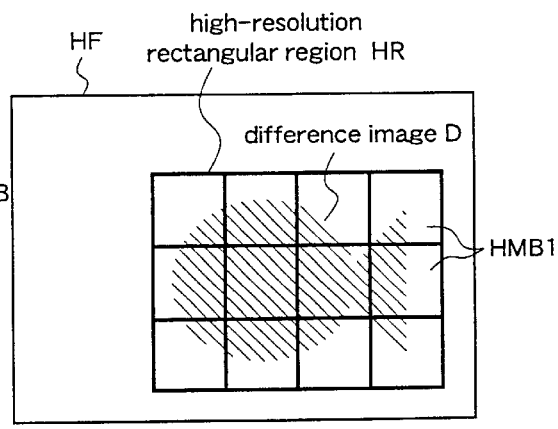

FIG. 1 is a block diagram showing an image processing apparatus (hierarchical image coding apparatus) according to a first embodiment of the present invention. FIGS. 2(a) to 2(d) are diagrams showing coding by the hierarchical image coding apparatus of the first embodiment. In FIG. 2(a), LF indicates a display image of the low-resolution image signal and Lob indicates an image of an object represented by the low-resolution image signal, which is displayed on a frame (display image) LF. In FIG. 2(b), HF indicates a display image of the high-resolution image signal and Hob indicates an image of an object represented by the high-resolution image signal, which is displayed on a frame (display image) HF. In these Figures, an inner portion of each object is represented by dots.

A hierarchical image coding apparatus 101 of the first embodiment is adapted to receive an input image signal and perform hierarchical coding to the input image signal as a high-resolution image signal HSg.

To be specific, the hierarchical image coding apparatus 101 comprises a subsampling unit 2 for subsampling the high-resolution image signal HSg, a low-resolution coding section 101L for coding the low-resolution image signal LSg as an output of the subsampling unit 2, a decoder 9a for decoding the low-resolution coded signal LEg, an upsampling unit 10a for upsampling an output Ldg of the decoder 9a, and a high-resolution coding section 101H for coding the high-resolution image signal HSg on the basis of the output LAg of the upsampling unit 10a, like the hierarchical image coding apparatus 200a.

The coding section 101L includes a region detecting unit 30a, a region extracting unit 5, a blocking unit 6, and an encoder 7, and the coding section 101H includes a region detecting unit 12, a region extracting unit 14, a blocking unit 15, and an encoder 16a, like the prior art hierarchical image coding apparatus.

In the first embodiment, only the region detecting unit 30a is different from that of the prior art hierarchical image coding apparatus 200a. Specifically, the region detecting unit 30a is used for detecting a range of the rectangular region LR including the object Lob on the low-resolution frame LF (see FIG. 2(a)), by referring to a signals HRg indicating a range of the rectangular region HR including the object Hob on the high-resolution frame HF (see FIG. 2(b)). More specifically, the region detecting unit 30a is used for detecting a spatial position HRp of the high-resolution rectangular region HR from the high-resolution signal HRg, and determining a spatial position LRp of the low-resolution rectangular region LR such that a spatial position ARp of an interpolated rectangular region AR resulting from upsampling of the low-resolution image signal LSg matches the spatial position HRp of the high-resolution rectangular region HR.

Note that the region detecting unit 30a detects the spatial position LRp in such a way that the spatial position ARp matches the spatial position HRp and does not necessarily detect the same in such a way that the spatial position LRp matches the spatial position HRp. The construction of the encoder 16a is identical to that of the encoder 16 in the prior art hierarchical image coding apparatus 200a.

Subsequently, operation is described.

When the high-resolution image signal HSg is input to the image coding apparatus 101 as the input image signal, the subsampling unit 2 subsamples the signal HSg and converts it into the low-resolution image signal LSg. Then, the coding sections 101H and 101L respectively perform coding to the high-resolution image signal HSg and the low-resolution image signal LSg, respectively.

To be specific, the high-resolution coding section 101H operates as in the high-resolution coding unit 201H of the prior art hierarchical image coding apparatus 200a and the low-resolution coding section 101L operates as in the low-resolution coding section 201L of the prior art hierarchical image coding apparatus 200a except how the region detecting unit 30a detects a position of the low-resolution rectangular region LR on the frame LF.

Hereinafter, operation of the region detecting unit 30a is mainly described for explaining coding by the low-resolution coding section 101L.

In this first embodiment, the region detecting unit 12 detects the rectangular region HR of the object Hob on the basis of the high-resolution image signal HSg (see FIG. 2(b)) and the region detecting unit 30a detects the spatial position LRP of the rectangular region LR of the low-resolution image signal LSg on the basis of the spatial position HRp of the high-resolution rectangular region HR (see FIG. 2(a)).

The region detecting unit 30a disposes the low-resolution rectangular region LR on the low-resolution frame LF in such a way that a reference position LRp thereof is apart from a reference position LFp of the low-resolution frame LF by distance LΔx and distance LΔy in horizontal and vertical directions, respectively, when a reference position HRp of the high-resolution rectangular region HR is apart from a reference position HFp of the high-resolution frame HF by distance HΔx and distance HΔy in the horizontal and vertical directions, respectively. The distance HΔx/distance LΔx and the distance HΔy/distance LΔy are made equal to a ratio of a spatial resolution of the high-resolution image to a spatial resolution of the low-resolution image (in this case 2/1).

By thus setting a position of the rectangular region LR on the low-resolution frame LF, the spatial position (reference position) of the low-resolution rectangular region LR matches the spatial position (reference position) of the high-resolution rectangular region HR.

The image signal LOg corresponding to the low-resolution rectangular region LR thus set on the low-resolution frame LF is divided into image signals respectively corresponding to blocks LMB into which the rectangular region is divided, by the blocking unit 6. The resulting blocked image signal LBg is coded by the encoder 7 and output as the low-resolution coded signal LEg. The block LMB is an image space comprising (16×16) pixels.

The low-resolution coded signals LEg is converted into the low-resolution decoded signal Ldg by the decoder 9a, which is interpolated and converted into the interpolated image signal LAg of the same spatial resolution as the high-resolution image signal HSg. As a result, each of blocks AMB into which the interpolated rectangular region AR corresponding to the interpolated image signal LAg obtained by upsampling the low-resolution coded image signal LEg is an image space comprising (32×32) pixels.

FIG. 2(c) shows an interpolated frame AF of the same spatial resolution as the high-resolution frame HF, and an interpolated image Aob of the interpolated image signal LAg. A relative position of the interpolated rectangular region AR in the interpolated frame AF matches a relative position of the high-resolution rectangular region HR in the high resolution frame HF.

Meanwhile, when the high-resolution image signal HSg is input to the region extracting unit 14, it extracts the image signal HOg corresponding to the high-resolution rectangular region HR according to the signal HRg from the region detecting unit 12. The blocking unit 15 divides the image signal into image signals respectively corresponding to blocks HMB1 into which the rectangular region HR is divided, and outputs the image signal HBg to the encoder 16a, which encodes the blocked image signal HBg into the high-resolution coded image signal HEg by referring to the interpolated image signal LAg. The block KMB1 is an image space comprising (32×32) pixels.

Since the relative position of the interpolated rectangular region AR in the frame AF matches the relative position of the high-resolution rectangular region HR in the frame HF, the encoder 16a is capable of calculating a difference value between the blocked image signals in the respective rectangular regions and is thereby capable of coding a difference value between a value of a pixel in the high-resolution image and a value of a pixel in the interpolated image with ease.

In FIG. 2(d), a difference image D corresponding to the difference value (error) D is shown on the frame HF.

Thus, in accordance with the first embodiment, since the spatial position of the block HMB 1 of the high-resolution rectangular region HR matches the spatial position of the block AMB of the interpolated rectangular region AR resulting from resolution conversion of the low-resolution rectangular region LR, the high-resolution image signal HSg can be coded by referring to the low-resolution image signal LSg without degrading coding efficiency, in hierarchical coding for the rectangular region HR including an object in the high-resolution frame HF.

EMBODIMENT 2

Figure 3:
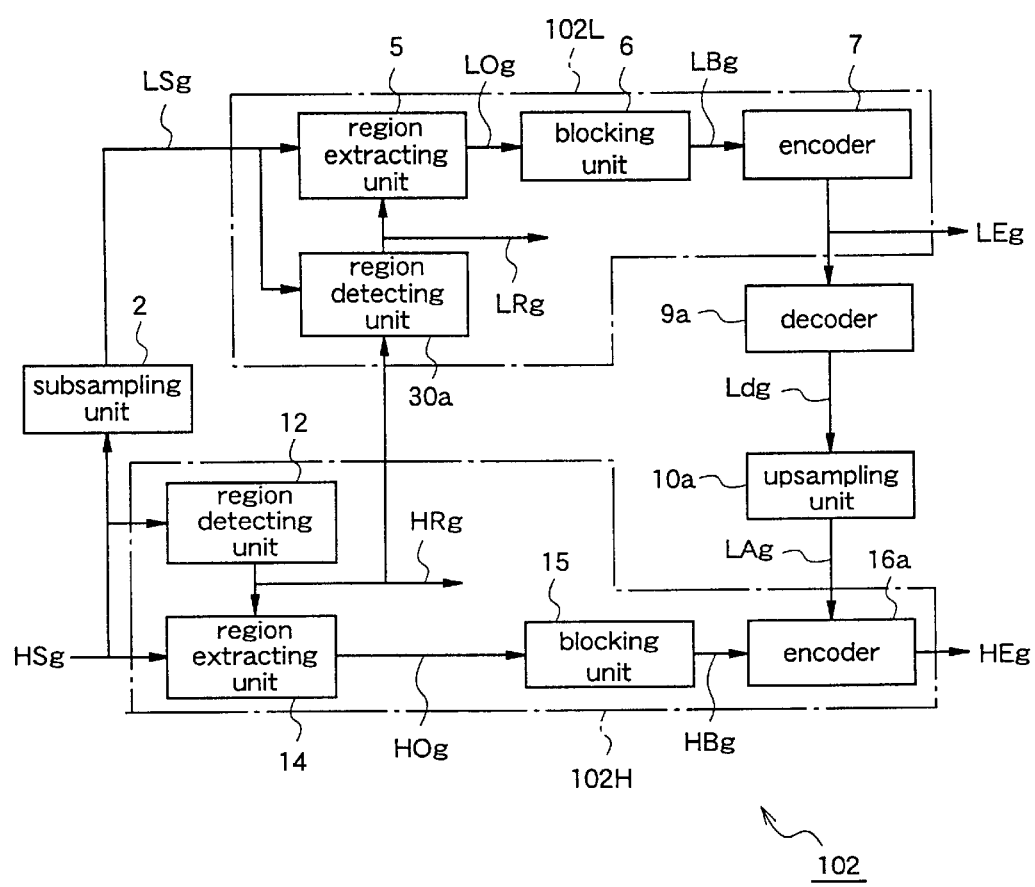
FIG. 3 is a block diagram for explaining a hierarchical image coding apparatus as an image processing apparatus according to a second embodiment of the present invention.

FIG. 3 is a block diagram showing an image processing apparatus (hierarchical image coding apparatus) according to a second embodiment of the present invention.

Although in the first embodiment, the hierarchical image coding apparatus performs coding to the difference value, i.e., the error between the interpolated image signal in which the low-resolution image signal has been resolution-converted and the high-resolution signal, there is a method which provides effectiveness more than the method for directly coding the difference value, in case of a binary image signal, i.e., a binary shape signal.

In an image coding apparatus 102, the encoder 16a of the first embodiment for coding the difference value between the interpolated image signal and the high-resolution image signal is replaced by an encoder 16b for coding a difference between boundaries of the image of the low-resolution image signal and the image of the high-resolution image signal. The other components are identical to those of the hierarchical image coding apparatus 101 of the first embodiment. In other words, a low-resolution coding section 102L in the hierarchical image coding apparatus 102 is identical to that of the first embodiment and a high-resolution coding section 102H in the hierarchical image coding apparatus 102 differs only in the encoder 16b from that of the first embodiment.

Operation and effects will now be described.

Figure 4:
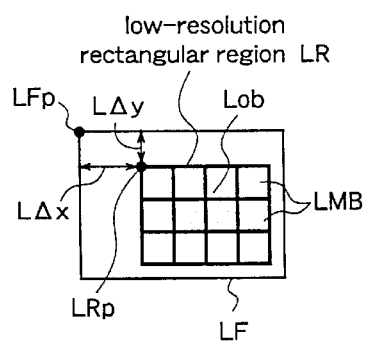
FIGS. 4(a) to 4(f) are diagrams for explaining operation of the hierarchical image coding apparatus according to the second embodiment of the present invention.
Figure 4:
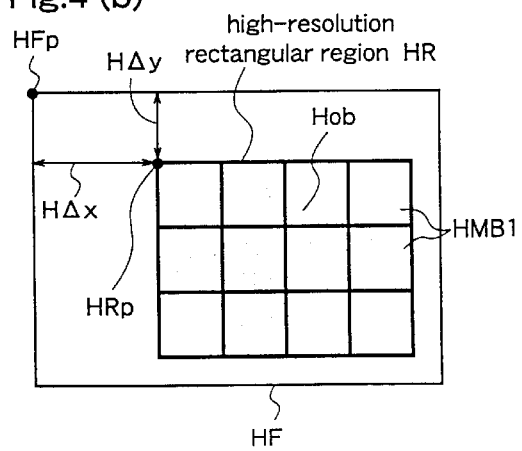
Figure 4:
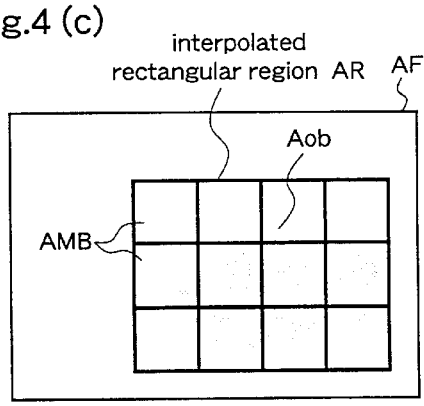
Figure 4:
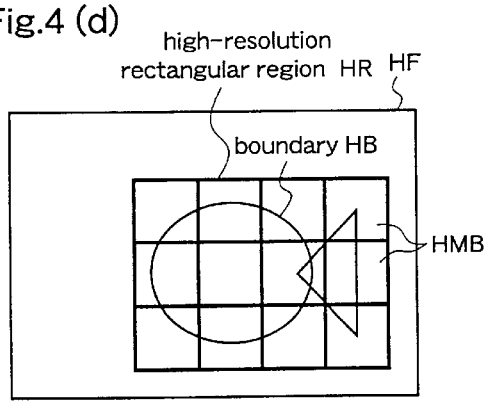
Figure 4:
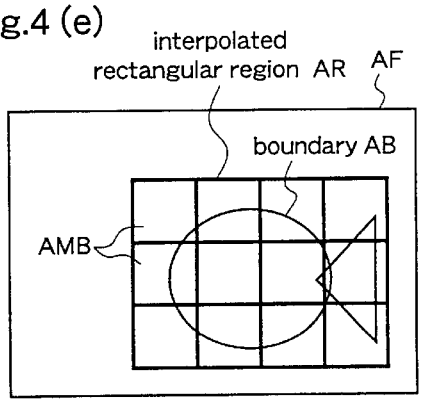
Figure 4:
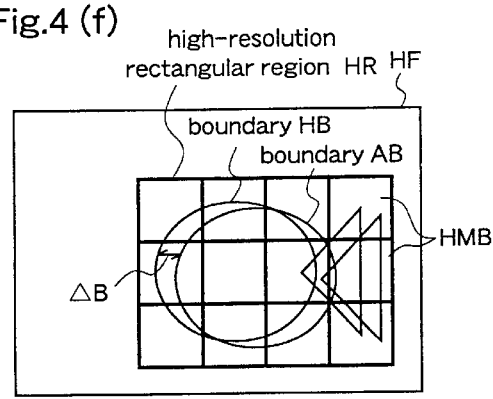

FIG. 4 is a diagram showing coding by the hierarchical image coding apparatus of the second embodiment, wherein FIGS. 4(a), 4(b), 4(c), 4(d), 4(e), and 4(f) show a frame LF corresponding to the low-resolution image signal, a frame HF corresponding to the high-resolution image signal, a frame AF corresponding to the resolution-converted image signal (interpolated image signal), a boundary HB of an object Hob in the rectangular region HR set on the frame HF, a boundary AB of an object Aob in the rectangular region AR set on the frame AF, and the boundaries HB and AB which are overlapped on the frame HF, respectively.

A "boundary" of an object refers to positions of pixels in which a value of a binary-shape signal of the image signal changes spatially.

In this second embodiment, the region detecting unit 12 of the high-resolution coding section 102H detects the rectangular region HR of an object on the basis of the high-resolution image signal HSg (see FIG. 4(b)) and the region detecting unit 30a of the low-resolution coding section 102L detects the spatial position LRp of the rectangular region LR in a way that it matches a spatial position of the rectangular region HR (see FIG. 4(a)), like the first embodiment.

By thus setting the position LRp on the low-resolution frame LF, the position LRp matches the spatial position HRp of the high-resolution rectangular region HR.

Then, the image signal LOg corresponding to the low-resolution rectangular region this set on the low-resolution frame is blocked by the blocking unit 6 and then the resulting blocked image signal LBg is encoded by the encoder 7 to be output as the low-resolution coded signal LEg. The low-resolution coded signal LEg is decoded by the decoder 9a and interpolated by the upsampling unit 10a, to be converted into the interpolated image signal LAg of the same spatial resolution as the high-resolution image signal (see FIG. 4(c)).

Meanwhile, the region extracting unit 14 extracts the image signals HOg corresponding to the high-resolution rectangular region HR from the high-resolution image signal HSg and the blocking unit 15 performs blocking to the image signal HOg.

The encoder 16b encodes a difference ΔB between the boundary HB of the object Hob obtained from the blocked image signal HBg and the boundary AB of the object Aob obtained from the interpolated image signal LAg and outputs high-resolution coded signal HEg.

Thus, in accordance with the second embodiment, the hierarchical image coding apparatus comprises the encoder 16b for encoding the difference between the boundary of the interpolated image obtained from the low-resolution image signal and the boundary of the image obtained from the high-resolution image signal. Thereby, it is possible to perform hierarchical coding to the binary image signal with high efficiency.

While this second embodiment shows hierarchical coding in which the difference between the boundary HB of the high-resolution image Hob and the boundary AB of the interpolated image Aob, is coded, the hierarchical coding of the binary image signal may be performed by changing a coding table for use in coding of the high-resolution image signal for each pixel depending upon the interpolated image signal obtained from the low-resolution image signal.

EMBODIMENT 3

Figure 5:
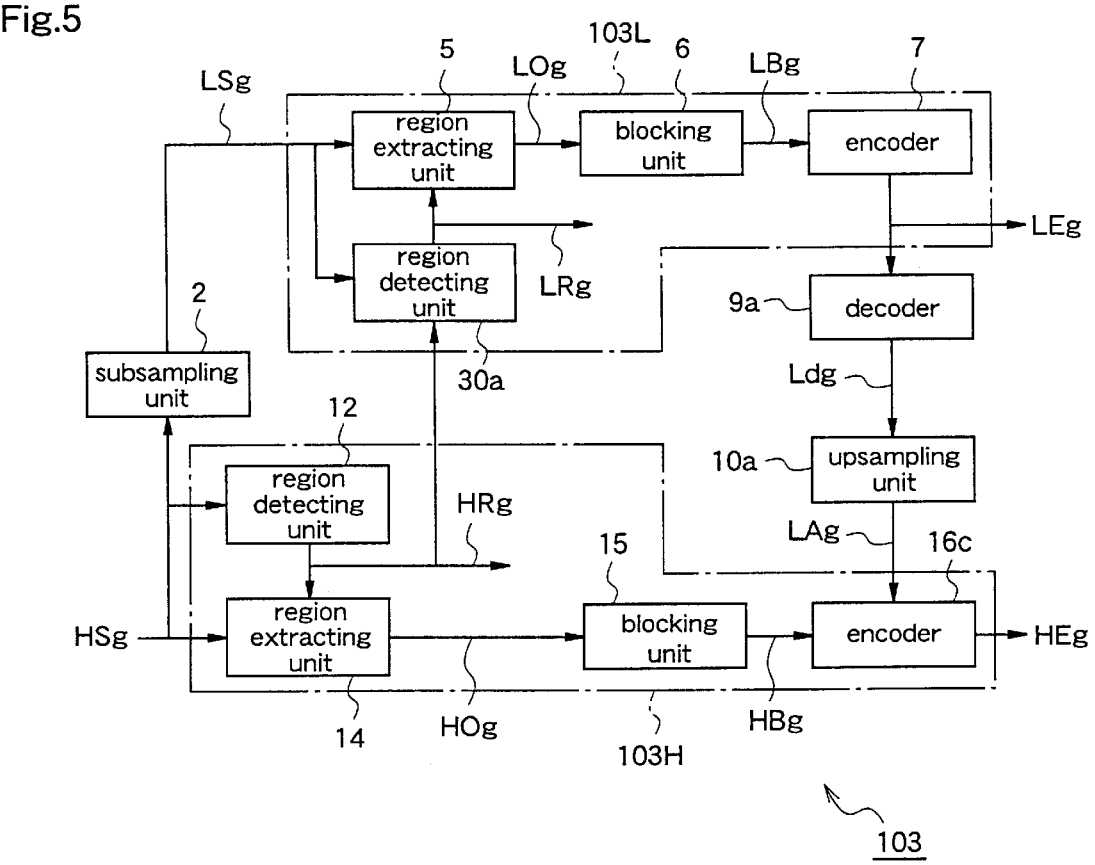
FIG. 5 is a block diagram for explaining a hierarchical image coding apparatus as an image processing apparatus according to a third embodiment of the present invention.

FIG. 5 is a block diagram showing an image processing apparatus (hierarchical image coding apparatus) according to a third embodiment of the present invention.

Although in the first embodiment a case where the position of each block of the interpolated rectangular region perfectly matches the position of each block of the high-resolution rectangular region has been described, it is also possible to perform hierarchical coding without degrading coding efficiency as in the first embodiment if an integrated block comprising plural blocks of the high-resolution rectangular region matches a block of the interpolated rectangular region.

In a hierarchical image coding apparatus 103 of the third embodiment, the encoder 16a which finds the difference value between the blocked interpolated image signal and the blocked high-resolution image signal is replaced by an encoder 16c which compares the integrated signal comprising blocked high-resolution image signals with the blocked interpolated image signal to find a difference value between them and encodes the difference value. Also in this third embodiment, assume that a high-resolution block HMB 2 of the high-resolution rectangular region HR (see FIG. 6(b)) is an image space comprising (16×16) pixels like the low-resolution block LMB of the low-resolution rectangular region LR (see FIG. 6(b)) and an interpolated block AMB of the interpolated rectangular region AR (see FIG. 6(c)) is an image space comprising (32×32)pixels. Therefore, the blocking unit 15 is used for blocking the high-resolution image signal for each block HMB2 comprising (16×16) pixels. The other components in the hierarchical image coding apparatus 103 of the third embodiment are identical to those of the hierarchical image coding apparatus 101 of the first embodiment. That is, the low-resolution coding section 103L of the third embodiment is identical to that of the first embodiment and the high-resolution coding section 103H differs only in the encoder 16c the blocking means is from that of the first embodiment.

Operation and effects will now be described.

Figure 6:
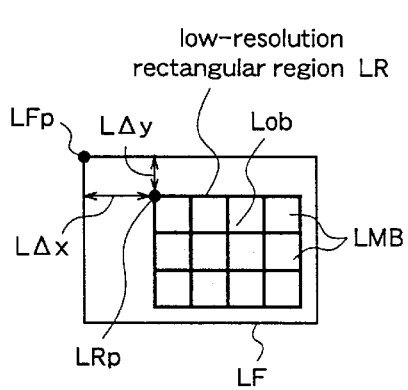
FIGS. 6(a) to 6(d) are diagrams for explaining operation of the hierarchical image coding apparatus according to the third embodiment of the present invention.
Figure 6:
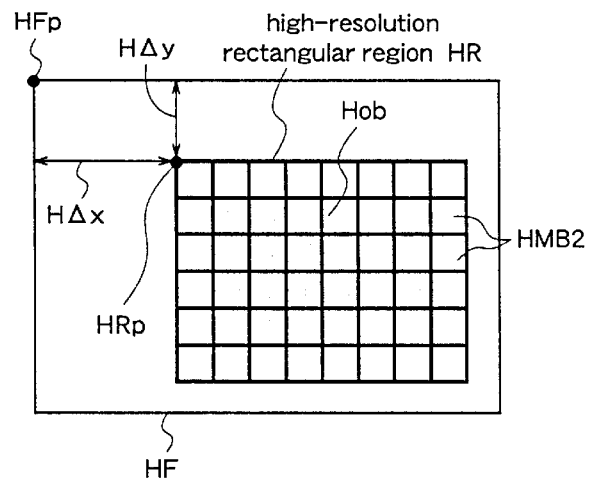
Figure 6:
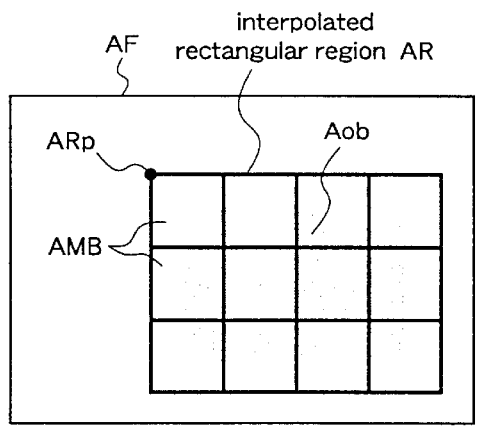
Figure 6:
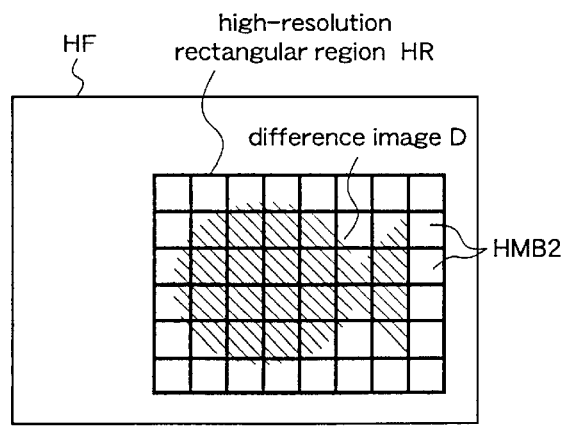

FIG. 6 is a diagram showing coding by the hierarchical image coding apparatus of the third embodiment of the present invention, wherein FIGS. 6(a), 6(b) and 6(c) indicate a display image (frame) LF corresponding to the low-resolution image signal, a display image (frame) HF corresponding to the high-resolution image signal, and a display image (frame) AF corresponding to the interpolated image signal in which the low-resolution image signal has been resolution-converted, respectively.

In this third embodiment, the region detecting unit 12 detects the rectangular region HR (see FIG. 6(b)) of the object Hob on the basis of the high-resolution image signal HSg and the region detecting unit 30a detects the spatial position LRp (see FIG. 6(a)) of the rectangular region LR of the low-resolution image signal LSg in a way that the spatial position HRp of the rectangular region HR matches the spatial position ARp of the interpolated rectangular region AR.

By thus setting the spatial position LRp of the rectangular region LR on the low-resolution frame LF, the spatial position LRp virtually matches the spatial position HRp.

Then, image signal LOg corresponding to the low-resolution rectangular region thus set on the low-resolution frame LF is blocked by the blocking unit 6 and then the resulting blocked image signal LBg is coded by the encoder 7, to be output as low-resolution coded signal LEg. The low-resolution coded signal LEg is decoded by the decoder 9a and interpolated by the upsampling unit 10a, to be converted into the interpolated image signal LAg of the same spatial resolution as the high-resolution image signal (see FIG. 6(c)).

Meanwhile, the region extracting unit 14 extracts the image signal HOg corresponding to the rectangular region HR from the high-resolution image signal HSg and the blocking unit 15 blocks the image signal HOg into image signals respectively corresponding to blocks HMB2 each comprising (16×16) pixels.

Sine one block AMB of the rectangular region AR corresponds with an integrated region composed of 4 blocks HMB2 of the rectangular region HR, the encoder 16c encodes an image signal HBg corresponding to the 4 blocks HMB2 by referring to the interpolated image signal corresponding to one block AMB. That is, the encoder 16c encodes a difference value between the image signal HBg of the 4 blocks HMB2 and the interpolated image signal LAg of one block AMB and outputs the high-resolution coded signal HEg.

Thus, in accordance with the third embodiment, since coding is performed to the difference signal between the high-resolution image signal HBg corresponding to the integrated region comprising 4 high-resolution blocks HMB2 and the interpolated image signals LAg corresponding to one interpolated block AMB which corresponds with the integrated region, it is possible to establish a correspondence between the pixels of the high-resolution block and the interpolated block and, therefore perform coding to the high-resolution image signal by referring to the low-resolution image signal, even if there is no one-to-one correspondence between the high-resolution block and the interpolated block.

In addition, since it is possible to establish a correspondence between the high-resolution block and the interpolated block as described above, predictive coding of information for each block (coding mode information and the like) is implemented with ease and simultaneously coding efficiency is improved by establishing a correspondence between spatial positions of these blocks.

Further, in accordance with the third embodiment, since the size of the block corresponding to the divided low-resolution rectangular region is equal to that of the block corresponding to the divided high-resolution rectangular region, the encoder 7 of the low-resolution coding section has the same construction as the encoder 17 of the high-resolution coding section. Thereby, a hardware resource of the coding section can be shared with ease by time sharing or the like.

EMBODIMENT 4

Figure 7:
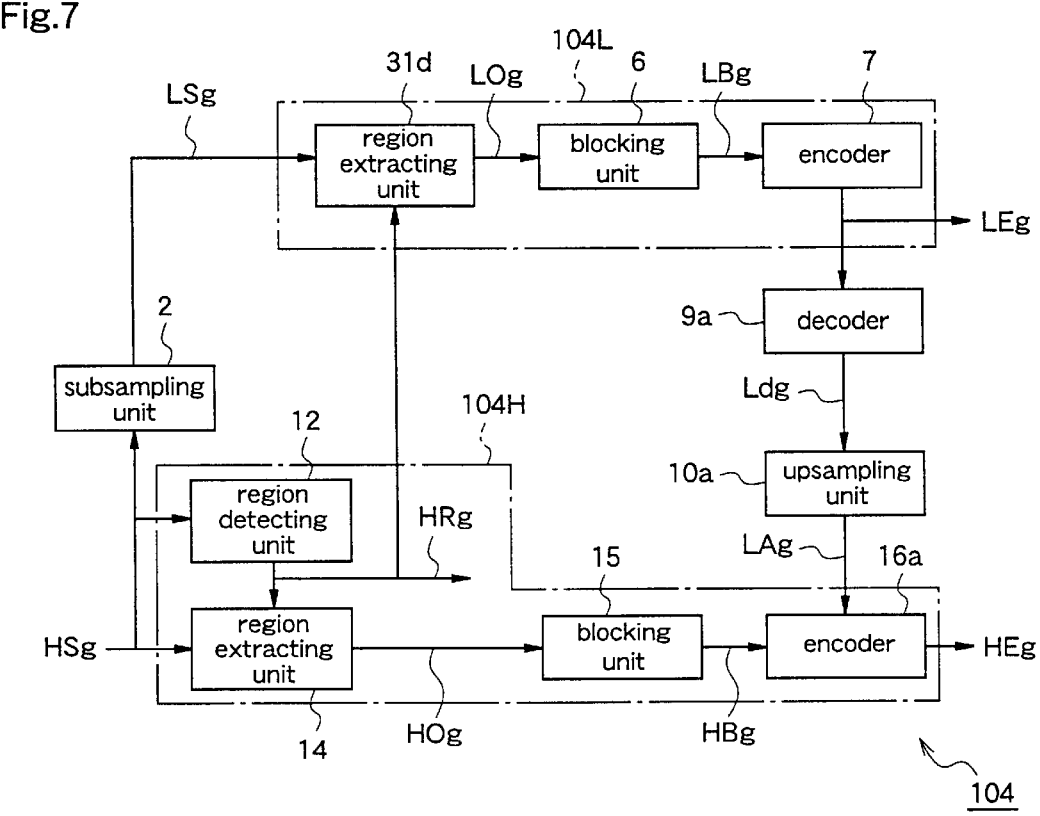
FIG. 7 is a block diagram for explaining a hierarchical image coding apparatus as an image processing apparatus according to a fourth embodiment of the invention.

FIG. 7 is a block diagram showing an image processing apparatus (hierarchical image coding apparatus) according to a fourth embodiment of the present invention.

In a hierarchical image coding apparatus 104 of the fourth embodiment, the region detecting unit 30a of the first embodiment is dispensed with, and the region extracting unit 5 of the first embodiment is replaced by a region extracting unit 31d for extracting the low-resolution rectangular region LR on the low-resolution frame LF in a spatial position corresponding to that of the high-resolution rectangular region HR according to an output HRg of the region detecting unit 12 of the first embodiment.

To be specific, a low-resolution coding section 104L comprises the region extracting unit 31d, a blocking unit 6 for blocking an output thereof, and an encoder 7 for encoding blocked image signals. A high-resolution coding section 104H comprises an region detecting unit 12, an region extracting unit 14, a blocking unit 15, and an encoder 16a like the high-resolution coding section 101H of the first embodiment.

Operation and effects will now be described.

According to an operation principle of a method for converting spatial resolution by the subsampling unit 2, when a shape of an object corresponding to the interpolated image signal obtained by performing resolution-conversion to the low-resolution image signal is always smaller than that of an object of the high-resolution image signal, an object Lob of the low-resolution image signal is fully included in the low-resolution rectangular region LR by making the spatial position HRp (see FIG. 2(b)) of the high-resolution rectangular region HR match the corresponding spatial position LRp (see FIG. 2(a)) of the low-resolution rectangular region LR.

This means that there is no necessity of extracting the signal LRg of the rectangular region LR from the low-resolution image signal LSg unlike in the first embodiment. Therefore, the same effect as in the first embodiment is realized with a simple construction, so long as the subsampling unit 2 meets the above condition.

That is, in the hierarchical image coding apparatus 104 of the fourth embodiment, the high-resolution image signal HSg is processed by the high-resolution coding section 104h like the first embodiment.

The low-resolution image signal LSg obtained by subsampling the high-resolution image signals HSg is coded by the low-resolution coding section 104L like the first embodiment. Specifically, the region extracting unit 31d receives the low-resolution image signal LSg, decides a position of the rectangular region on the low-resolution frame according to the output HRg of the region detecting unit 12, and outputs the image signal Log corresponding to the rectangular region to the blocking unit 6, which blocks the image signal LOg and then the encoder 7 encodes the blocked image signal LBg, and the resulting low-resolution coded signal LEg is output from the low-resolution coding section 104L for each block.

The low-resolution coded signal LEg is decoded by the decoder 9a and an output Ldg of the decoder 9a is converted into an interpolated image signals LAg of the same spatial resolution as the high-resolution image signal by the upsampling unit 10a and output to the encoder 16a of the high-resolution coding section 104H.

Thus, in accordance with the fourth embodiment, the region extracting unit 31d of the low-resolution coding section 104L determines the position of the rectangular region LR on the low-resolution frame according to the signal HRg, i.e., the output of the region detecting unit 12 of the high-resolution coding section 104H. As a result, a circuit for extracting a region is unnecessary in the low-resolution coding section 104L and therefore the same effects as provided by the image coding apparatus of the first embodiment is realized with a simple construction.

EMBODIMENT 5

Figure 8:
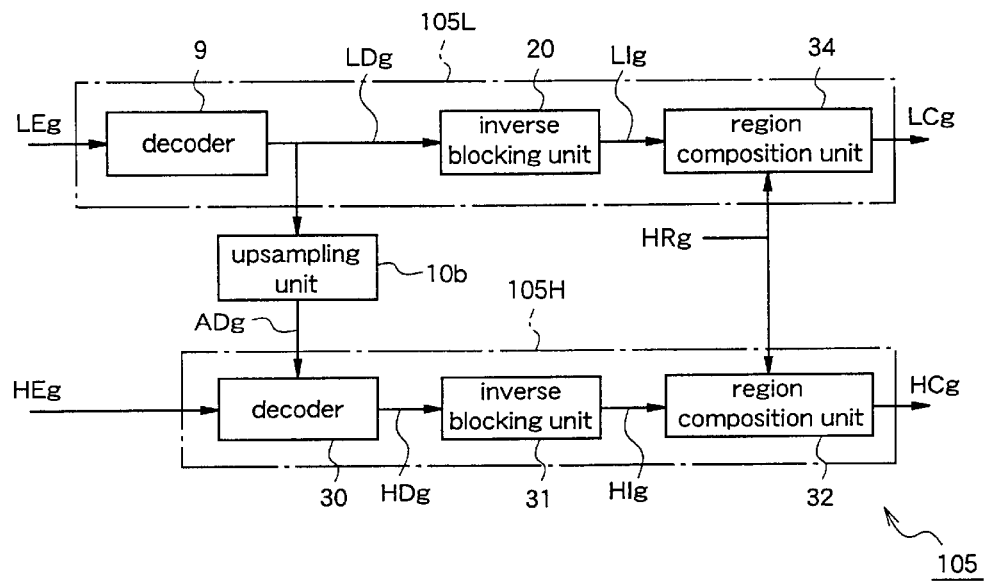
FIG. 8 is a block diagram for explaining a hierarchical image decoding apparatus as an image processing apparatus according to a fifth embodiment of the present invention.

FIG. 8 is a block diagram showing an image processing apparatus (hierarchical image decoding apparatus) according to a fifth embodiment of the present invention.

A hierarchical image decoding apparatus 105 of the fifth embodiment is adapted to receive the low-resolution coded signal LEg and the high-resolution coded signal HEg which have been coded by the hierarchical image coding apparatus 104 of the fourth embodiment shown in FIG. 7 as input signals and perform hierarchical decoding to the same. To be specific, the hierarchical image decoding apparatus 105 comprises a low-resolution decoding section 105L for decoding the low-resolution coded signal LEg to provide a low-resolution reproduced signal LCg, an upsampling unit 10b for upsampling the decoded signal LDg for interpolation, and a high-resolution decoding section 105H for decoding the high-resolution coded signal HEg to provide a high-resolution reproduced signal HCg on the basis of the output Adg of the upsampling unit 10b, like the prior art hierarchical image decoding apparatus 200b.

The decoding sections 105L comprises a decoder 9, an inverse blocking unit 20, and a region composition unit 3, and the decoding section 105H comprises a decoder 30, an inverse blocking unit 31, and a region composition unit 32, like the prior art hierarchical image decoding apparatus.

Figure 24:
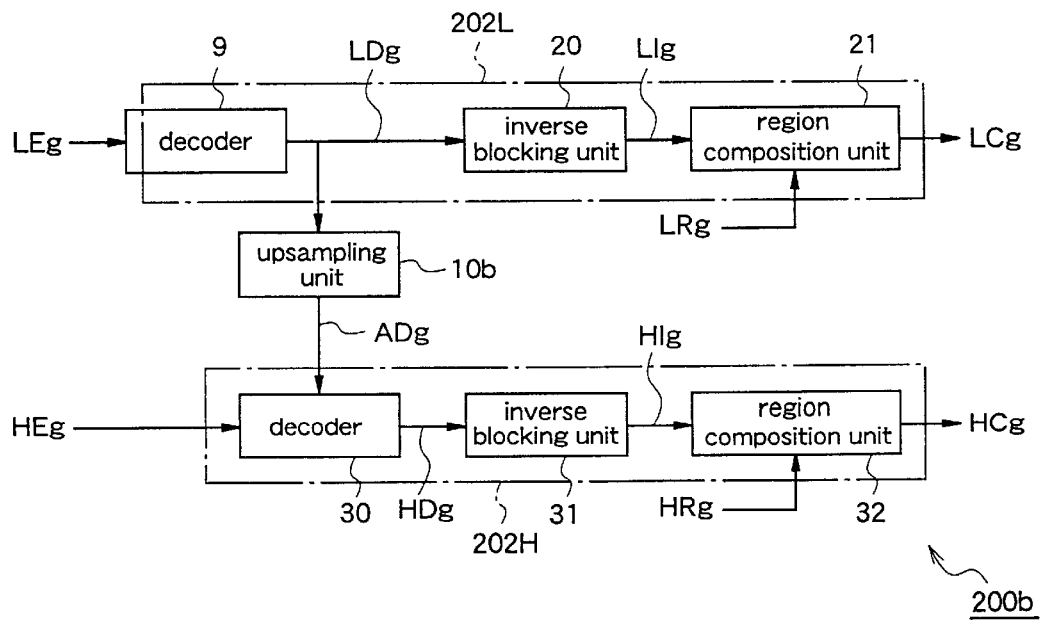
FIG. 24 is a block diagram for explaining a hierarchical image decoding apparatus as a prior art image processing apparatus.

The hierarchical image decoding apparatus 105 of the fifth embodiment differs from the prior art hierarchical image decoding apparatus 200b in FIG. 24 only in that the region composition unit 34 is used for compositing an image signal LIg corresponding to the low-resolution rectangular region and the other image signals on a frame so that it is disposed in a position of the low-resolution frame indicated by the signal HRg by referring to the high-resolution signal HRg from the hierarchical image coding apparatus 104 of the fourth embodiment.

Operation will now be described.

When the low-resolution coded signal LEg and the high-resolution coded image signal HEg are input to the hierarchical image decoding apparatus 105 from the hierarchical image coding apparatus 104, the low-resolution coded signal LEg is decoded by the decoder 9 of the low-resolution decoding section 105L, the output LDg of which is integrated by the inverse blocking unit 20, the output LIg of which is composited together with the image signal corresponding to the low-resolution frame according to the high-resolution signal HRg.

Concurrently with this operation, the output LDg of the decoder 9 is interpolated by the upsampling unit 10b and output to the high-resolution decoding section 105H.

In the high-resolution decoding section 105H, the high-resolution coded signal HEg is decoded on the basis of the interpolated image signal ADg from the upsampling unit 10b and according to the high-resolution signal HRg as in the prior art hierarchical image decoding apparatus 200b.

Thus, in this fifth embodiment, the coded signals LEg and HEg from the hierarchical image coding apparatus 104 of the fourth embodiment and the signal HRg are received by the hierarchical image decoding apparatus, wherein the low-resolution rectangular region is composited in the spatial position of the low-resolution frame indicated by the high-resolution signal HRg in the same manner that the region extracting unit 30d of the fourth embodiment.

Therefore, by disposing an image corresponding to a decoded image signal integrated by the inverse-blocking unit 20 in the low-resolution space set on the low-resolution frame, the coded signals LEg and HEg which have been coded by the hierarchical image coding apparatus of the fourth embodiment can be decoded correctly.

EMBODIMENT 6

FIGS. 9(a) and 9(b) are diagrams showing an image processing apparatus (hierarchical image coding apparatus) according to a sixth embodiment of the present invention.

A hierarchical image coding apparatus 106 of the sixth embodiment comprises a subsampling unit 2, a low-resolution coding section 106L, a decoder 9a, an upsampling unit 10a, and a high-resolution coding section 106H, like the hierarchical image coding apparatus 101 of the first embodiment shown in FIG. 1. The same reference numerals as those in these Figures designate or corresponding parts of the first embodiment.

In the low-resolution coding section 106L for coding the low-resolution image signal LSg of this embodiment, the encoder 7 of the low-resolution coding section 101L of the first embodiment is replaced by an encoder 7f for producing and outputting a low-resolution coded signal LEg of a blocked low-resolution image signal LBg, and a coding mode signal Mg indicating a coding mode of the blocked image signal LBg. The other components are identical to those of the first embodiment.

In addition, in the high-resolution coding section 106H for coding the high-resolution image signal HSg, the encoder 16a of the high-resolution coding section 101H of the first embodiment is replaced by an encoder 16f for coding the blocked high-resolution image signal HBg according to the coding mode signal Mg as well as the output LAg of the upsampling unit 10a. The other components are identical to those of the first embodiment.

The encoder 16f includes a mode decision unit 50 for receiving the blocked high-resolution image signal HBg, deciding its mode, and outputting a coding mode signal MD of the high-resolution blocks, a mode encoder 51 for encoding the coding mode signal MD according to the coding mode signal Mg of the blocked low-resolution image signal LBg changing the coding method for the coding mode signal MD according to the coding mode signal Mg and outputting a coded mode signal EMg, and first and second encoders 53 and 54 in which the high-resolution blocked image signals HBg are coded differently (see FIG. 9(b)).

The first encoder 53 is used for coding the high-resolution blocked image signal HBg by referring to an interpolated signal LAg obtained by upsampling the low-resolution decoded signal LDg. The second encoder 54 is used for coding the high-resolution blocked image signal HBg without referring to the interpolated signal LAg. The mode decision unit 50 is used for deciding whether the blocked image signal HBg is coded with/without reference to the interpolated signal LAg.

The encoder 16f further includes a primary switch 52 for supplying one of the first and second encoders 53 and 54 with the high-resolution blocked image signal HBg in accordance with the coding mode signal MD from the mode decision unit 50 and a secondary switch 55 for selecting one of outputs HEg1 and HEg2 of the first and second encoders 53 and 54 in accordance with the coding mode signal MD, and a multiplexer 56 for multiplexing an output SHEg of the primary switch 55 and the coded mode signal EMg.

Operation and effects will now be described.

When the high-resolution image signal HSg is input to the hierarchical image coding apparatus 106, the signal HSg is subsampled by the subsampling unit 2 to generate the low-resolution image signal LSg, which is coded in the low-resolution coding section 106L, wherein the encoder 7f outputs the coding mode signal MG of the blocked image signal HBg when coding the signal HBg.

Meanwhile, in the high-resolution coding section 106H, by region detection and region extraction for the high-resolution image signal HSg like the first embodiment, the image signal HOg of the high-resolution rectangular region HR is produced and then blocked, resulting in the blocked image signal HBg corresponding to the high-resolution block HMB1, which is coded by the encoder 16f on the basis of the upsampled output LAg and the coding mode signal Mg.

In brief, the hierarchical coding of the hierarchical image coding apparatus 106 of the sixth embodiment differs from that of the first embodiment in that the coding mode signal Mg is output from the encoder 7f of the low-resolution coding section 106L to the encoder 16f of the high-resolution coding section 106H, which encodes the blocked high-resolution image signal HBg by referring to the coding mode signal Mg.

Operation of the encoder 16f will now be described in detail.

In the encoder 16f, a method for coding the image signal HBg is decided according to mode decision of the mode decision unit 50. That is, it is decided whether the image signal HBg is coded with/without reference to the interpolated signal LAg. The coding mode signal MD in accordance with this mode decision is output from the mode decision unit 50, and according to the coding mode signal MD, one of the first and second encoders 53 and 54 is selected by the switches 52 and 55, whereby the high-resolution image signal HBg is coded by the selected encoder and output to the multiplexer 56.

Concurrently with this operation, the mode encoder 51 encodes the coding mode signal MD according to the coding mode Mg of the low-resolution block, and then the multiplexer 56 multiplexes the output SHEg of the switch 55 and the output EMg of the mode encoder 51 and outputs the high-resolution coded signal HEg.

Thus, in accordance with the sixth embodiment, the encoder 16f encodes the high-resolution block by referring to the coding mode of the low-resolution block. As a result, hierarchical coding with higher efficiency is realized.

This is because there is a correlation between the coding mode of the high-resolution block and the coding mode of the corresponding low-resolution block. For example, when the low-resolution block is located on a boundary of an object, it is highly probable that the corresponding high-resolution block is located thereon. Similarly, when the low-resolution block is located inside or outside the object, it is highly probable that the high-resolution block is located there.

As described above, since it is highly probable that the coding mode of the low-resolution block and the coding mode of the high-resolution block match, predictive coding is performed by the encoder 16f of the high-resolution coding section 106H, by referring to the coding mode signal Mg of the low-resolution block and assigning a code of shorter length to the coding mode signal of high-resolution block of the same mode as the coding mode signal Mg, whereby the number of bits to be coded is reduced as compared with a case in which the coding mode signal Mg is not referred to.

In this sixth embodiment, changing of a coding method of the high-resolution image signal and changing of a coding method of the coding mode of the high-resolution block have been performed in accordance with the coding mode of the low-resolution block. Alternatively, only changing of the coding method for the high-resolution image signal according to the coding mode of the low-resolution block may be performed.

In addition, although in this embodiment, the hierarchical image coding apparatus 106 performs hierarchical coding of the hierarchical image coding apparatus 101 of the first embodiment in FIG. 1 according to the coding mode of the low-resolution block as well as the low-resolution image signal, this hierarchical image coding apparatus is not limited to the one of the sixth embodiment. For example, the hierarchical image coding apparatus may perform hierarchical coding of the third embodiment in FIG. 5 according to the low-resolution image signal and the coding mode of the low-resolution block.

In this case, coding is performed to a coding mode of the high-resolution block HMB2 comprising (16×16) pixels (see FIG. 6(b)) by referring to a coding mode of the low-resolution block LMB comprising (16×16) pixels (see FIG. 6(a)), for each integrated region comprising 4 high-resolution blocks HMB2 which correspond to one interpolated block AMB comprising (32×32) pixels (see FIG. 6(c)). Also in this case, for information as a unit which is smaller than the low-resolution block LMB (prediction error of a pixel value, etc), difference (difference image D) between pixel values of the high-resolution frame HF (FIG. 6(b)) and pixel values of the resolution-converted (interpolated) frame AF (FIG. 6(c)) is calculated for each pixel as shown in FIG. 6(d) and the resulting difference signal is coded for each small block comprising (16×16) pixel, like the third embodiment.

EMBODIMENT 7

FIGS. 10(a) and 10(b) are block diagrams showing an image processing apparatus (hierarchical image decoding apparatus) according to a seventh embodiment of the present invention.

A hierarchical image decoding apparatus 107 of this embodiment comprises a low-resolution decoding section 107L, an upsampling unit 10b, and a high-resolution decoding section 107H, like the prior art hierarchical image decoding apparatus 200b in FIG. 24. Herein, the same reference numerals as those of the prior art image decoding apparatus 200b designate the same or corresponding parts. This hierarchical image decoding apparatus 107 differs from the prior art hierarchical image decoding apparatus 200b in that the high-resolution coded signal HEg is decoded by referring to the coding mode Mg output from the decoder 9g.

To be specific, in the low-resolution decoding section 107L for decoding the low-resolution coded signal LEg, the decoder 9 of the low-resolution decoding section 202L of the prior art hierarchical image decoding apparatus 200b is replaced by the decoder 9g which outputs a low-resolution decoded signal LDg and the coding mode signals Mg. The other components are identical to those of the prior art hierarchical image decoding apparatus 200b.

In addition, in the high-resolution decoding section 107H for decoding the high-resolution coded signal HEg, the decoder 30 of the high-resolution coding section 201H of the prior art hierarchical image decoding apparatus 200b is replaced by a decoder 40g for decoding the high-resolution coded image signal HEg according to the coding mode signals Mg as well as the output ADg of the upsampling unit 10b. The other components are identical to those of the prior art hierarchical image decoding apparatus 200b.

The decoder 40g includes a separator 60 for separating and extracting a coded mode signal EMG from the high-resolution coded signal HEg, a mode decoder 61 for decoding the extracted coded mode signal EMG, and first and second decoders 63 and 64 in which the coded mode signal EMG and the extracted high-resolution coded signal SHEg are decoded differently.

The decoder 40g further includes a primary switch 62 for supplying one of the first and second decoders 63 and 64 with the high-resolution coded image signal SHEg in accordance with a coding mode signal DMg which has been decoded by the decoder 61 and a secondary switch 65 for selecting one of outputs HDg 1 and HDg 2 of the first and second decoders 63 and 64 in accordance with the decoded mode signal DMg and outputting a high-resolution decoded signal HDg.

To be specific, the first decoder 63 is used for decoding the high-resolution coded image signal HEg by referring to an interpolated signal ADg in which the low-resolution decoded signal LDg has been upsampled. The second decoder 64 is used for decoding the high-resolution coded image signal HEg without referring to the interpolated signal ADg.

Operation and effects will now be described.

When the low-resolution coded signal LEg and the high-resolution coded image signal HEg are input to the hierarchical image decoding apparatus 107, in the low-resolution coding section 107L, the low-resolution coded signal LEg is decoded and then inversely blocked, and a low-resolution decoded signal LIg corresponding to a rectangular region which has been integrated by inverse blocking is composited together with the other image signals of a frame by the region composition unit 21.

During this decoding, the low-resolution decoded signal LDg and the coding mode signal Mg are output from the decoder 9a and the low-resolution decoded signal LDg is interpolated by the upsampling unit 10b and converted into an interpolated decoded signal ADg of the same resolution as the high-resolution decoded signal LDg.

Meanwhile, in the high-resolution coding section 107H, the high-resolution coded signal HEg is decoded by the decoder 40g according to the coding mode signal Mg and the interpolated decoded image signal ADg and the output HDg of the decoder 40g is inversely blocked by the inverse blocking unit 31. Then, a high-resolution decoded signal HIg of the rectangular region which has been integrated by inverse blocking is composited together with the other image signals of the frame by the region composition unit 32.

Operation of the decoder 40g will now be described in detail.

In the decoder 40g, the separator 60 separates the high-resolution coded signal HEg into a code portion EMg corresponding to the coding mode and the other code portion SHEg, and outputs the code portion EMG and the other code portion SHEg to the mode decoder 61 and the primary switch 62, respectively. The mode decoder 61 decodes the coded mode signal of the high-resolution block by referring to the coding mode signal Mg of the low-resolution block. That is, the decoding method for the coded mode signal of the high-resolution image block is changed according to the coding mode signal Mg of the low-resolution block. The switches 62 and 65 respectively select one of the first and second decoders 63 and 64 by referring to a decoded coding mode signal DMg of the high-resolution block, and outputs one of outputs HDg1 and HDg2 of the decoders as an output HDg of the decoder 40g.

Figure 9:
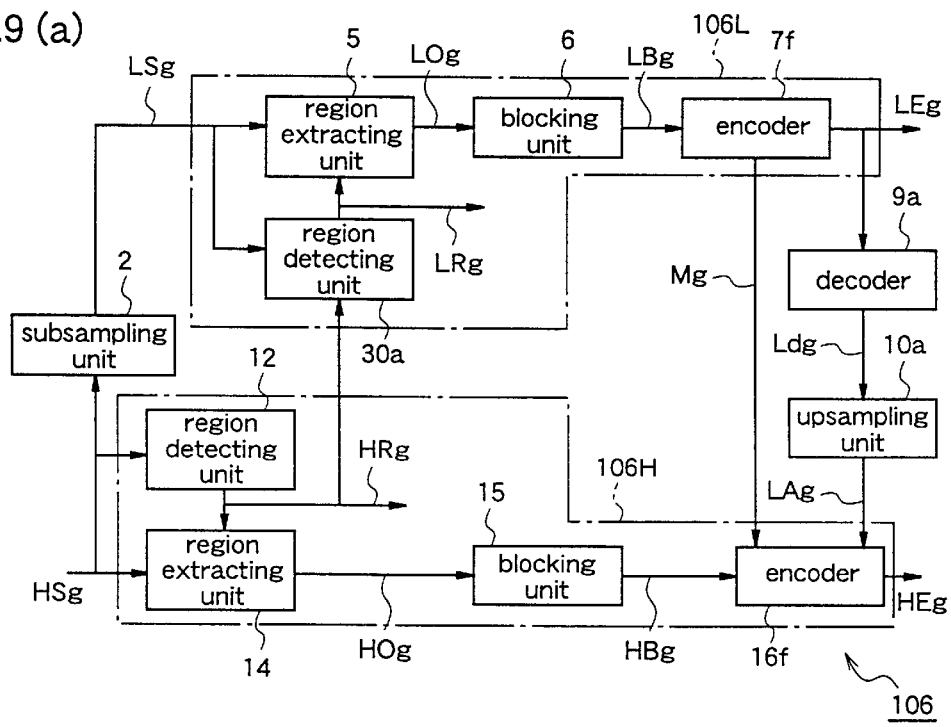
FIGS. 9(a) and 9(b) are block diagrams for explaining a hierarchical image coding apparatus as an image processing apparatus according to a sixth embodiment of the present invention.
Figure 9:
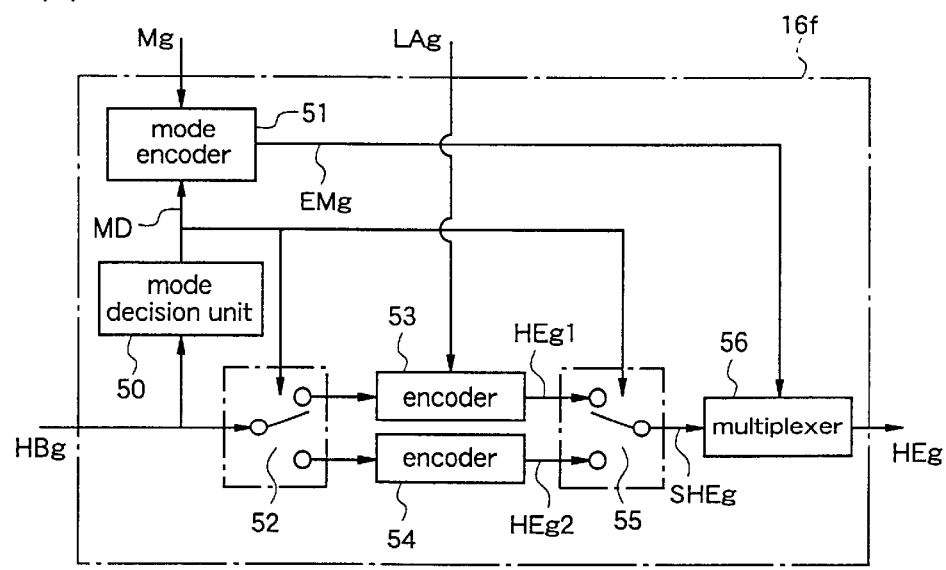

Thus, in accordance with the seventh embodiment, the high-resolution coded signal HEg is decoded according to the coding mode signal Mg of the low-resolution block as well as the interpolated decoded signal ADg obtained by upsampling the low-resolution decoded signal LDg. Therefore, the high-resolution coded signal HEg which has been coded by the hierarchical image coding apparatus 106 of the sixth embodiment in FIG. 9 is decoded by the decoder 40g by referring to the coding mode signal Mg, which is adapted to coding of the encoder 16f of the sixth embodiment. Thereby, it is possible to correctly decode the low-resolution coded signal LEg and the high-resolution coded signal HEg which have been coded by the hierarchical image coding apparatus of the sixth embodiment.

In this seventh embodiment, changing of a decoding method of the high-resolution coded signal and changing of a decoding method of the coding mode of the high-resolution coding have been performed, according to the block mode of the low-resolution block. Alternatively, changing of only one of the decoding method of the high-resolution image signal and the decoding method of the coding mode may be performed in accordance with the coding mode of the low-resolution block.

EMBODIMENT 8

Figure 11:
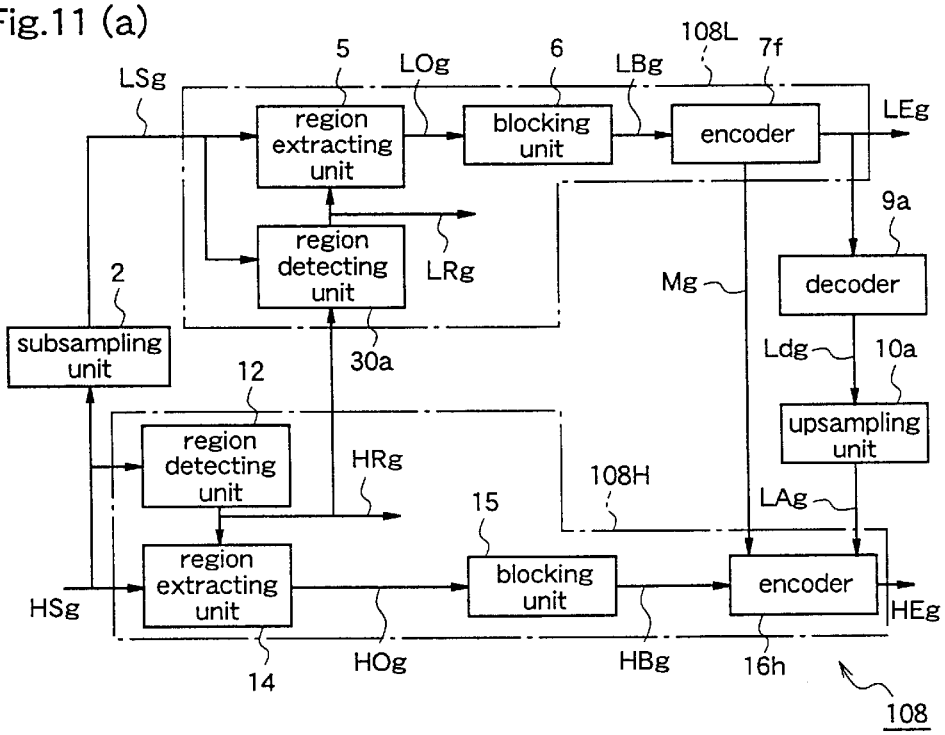
FIGS. 11(a) and 11(b) are block diagrams for explaining a hierarchical image coding apparatus as an image processing apparatus according to an eighth embodiment of the present invention.
Figure 11:
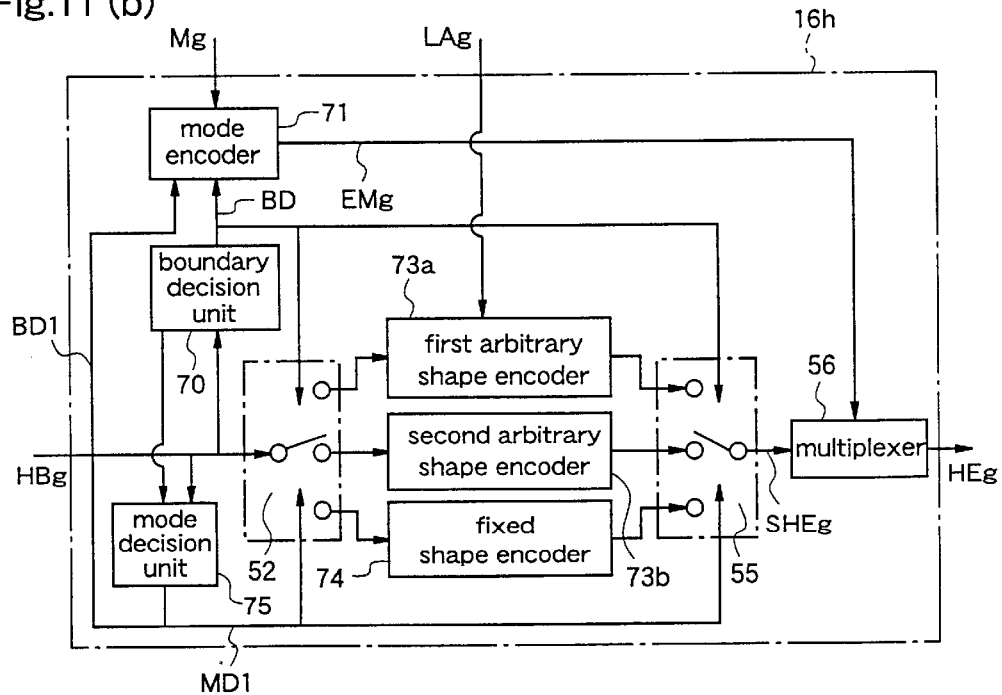

FIG. 11 is a diagram showing an image processing apparatus (hierarchical image coding apparatus) according to an eighth embodiment of the present invention, wherein FIG. 11(a) is a block diagram showing a construction of the hierarchical image coding apparatus and FIG. 11(b) is a block diagram showing a detailed construction of an encoder of the hierarchical image coding apparatus.

In a hierarchical image coding apparatus 108 of the eighth embodiment, the encoder 16f of the hierarchical image coding apparatus 106 of the sixth embodiment in FIG. 9 is replaced by an encoder 16h for changing a coding method according to a shape of an object. The other components are identical to those of the hierarchical image coding apparatus 106 of the sixth embodiment.

The encoder 16h of the eighth embodiment includes a boundary decision unit 70 which receives a blocked high-resolution coded signal HBg, decides whether a block of the signal HBg includes a boundary of an object or not, and outputs a decision signal BD according to the decision result and a decision signal BD1 indicating that the block includes the boundary, and a mode decision unit 75 which receives the high-resolution coded image signals HB and the decision signal BD1, and outputs an identification signal MD1 indicating with/without reference to a low-resolution image signal LSg when the block includes the boundary of the object.

The encoder 16h further includes a mode encoder 71 for encoding the decision signal BD and the identification signal MD1 according to the coding mode signal Mg of the low-resolution coded signal LEg changing the coding method for the decision signal BD and the identification signal MD1 according to the coding mode signal Mg and outputting a coded mode signal EMg, first and second arbitrary-shape encoders 73a and 73b of different coding methods for the high-resolution image signal HSg, a fixed-shape encoder 74 for performing fixed-shape coding to the high-resolution image signal HSg.

The first arbitrary shape encoder 73a is used for performing arbitrary-shape coding to the high-resolution coded image signal HSg by referring to the interpolated signal LAg in which the low-resolution decoded signal LDg has been upsampled. The second arbitrary-shape encoder 73b is used for performing arbitrary-shape coding to the high-resolution image signal HSg without referring to the interpolated signals LAg.

The encoder 16h still further includes a primary switch 52 for supplying one of the first and second arbitrary-shape encoders 73a and 73b, and the fixed-shape encoder 74 with the high-resolution image signal HSg according to the output BD of the boundary decision unit 70 and the output MD1 of the mode decision unit 75, a secondary switch 55 for selecting one of outputs of the first and second encoders 73a and 73b, and the fixed-shape encoder 74 according to the output MD1 of the mode decision unit 75 and the output MD1 of the mode decision unit 75, and a multiplexer 56 for multiplexing an output of the switch 55 and the coded mode signal EMg.

Operation and effects will now be described.

It is preferable that a coding method for an image signal including shape information of an object is changed according to a shape of the object.

To be specific, the arbitrary-shape encoder 73a or 73b performs arbitrary-shape coding to an image signal of an object whose boundary is included in a high-resolution block, and the fixed-shape encoder 74 performs coding to an image signal (fixed shape) in a high-resolution block located outside or inside the object.

When a low-resolution block includes a boundary of a object, it is highly probable that the corresponding high-resolution block includes the boundary. When a low-resolution block is located inside/outside the object, it is also highly probable that the corresponding high-resolution block is located there. Accordingly, if coding is performed to the high-resolution block by referring to the coding mode of the corresponding low-resolution block (positional relationship between the low-resolution block and the boundary of the object), coding efficiency is increased.

This will be described in detail. FIG. 12 is a diagram showing whether a low-resolution rectangular region and a high-resolution rectangular region are respectively inside/ outside the object. Specifically, FIG. 12(a) shows whether each block LMB of the low-resolution rectangular region LR in FIG. 2(a) is inside/outside an object Lob. FIG. 12(b) shows whether each block HMB 1 of the high-resolution rectangular region HR in FIG. 2(b) is inside/outside an object Hob. FIG. 12(c) shows whether each block AMB of the interpolated rectangular region AR in FIG. 2(c) is inside/outside an object Aob. FIG. 12(d) shows whether each block HMB 2 of the high-resolution rectangular region HR in FIG. 6(d) is inside/outside an object Hob. In these Figures, "I", "O", and "IO" indicate a block inside the object, a block outside the object, and a block on the boundary, respectively.

As shown in FIG. 12, comparing the interpolated rectangular region AR (FIG. 12(c)) corresponding to the interpolated image signal Lag obtained by performing resolution-conversion to the low-resolution image signal LSg with the high-resolution rectangular region HR (FIG. 12(b) or 12(d)) corresponding to the high-resolution image signal HSg, there is a close correlation between decision on whether the low-resolution block LMB is inside the object, is outside the object, or includes the boundary and decision on whether the high-resolution block HMB1 or HMB2 is inside the object, is outside the object, or includes the boundary.

In a case where it is decided by the boundary decision unit 70 whether the boundary is included in the high-resolution block or not, and then coding is performed by the mode encoder 71 to the coding mode signal BD indicating whether there is a boundary of the high-resolution image or not, by referring to the coding mode signal Mg indicating whether there is a boundary of the low-resolution image or not, if a match is found between them, codes of shorter length are assigned to the coding mode signals BD and BD1, whereby the number of bits to be coded is reduced.

An operation of the encoder 16h will now be described.

In the encoder 16h, the boundary decision unit 70 decides whether arbitrary-shape coding or fixed-shape coding is performed to the blocked high-resolution image signal HBg, and the mode decision unit 75 decides whether arbitrary-shape coding is performed to the blocked high-resolution image signal HBg with or without reference to the interpolated image signal LAg according to the decision signal BD1 from the boundary decision unit 70.

The switches 52 and 55 respectively select one of the first and second arbitrary-shape encoders 73a and 73b, and the fixed-shape encoder 74 according to the decision result of the decision units 70 and 75, whereby the high-resolution image signal HBg is coded by one of the selected encoders 73a, 73b, and 74, and output to the multiplexer 56.

Concurrently with this operation, the mode encoder 71 encodes the decision signals BD and MD1 according to the coding mode Mg, and the multiplexer 56 multiplexes the output SHEg of the switch 55 and the output of EMg of the mode encoder 71, and outputs the high-resolution coded signal HEg.

Thus, in accordance with the eighth embodiment, the encoder 16f encodes the coding mode of the high-resolution block by referring to the coding mode Mg of the low-resolution block. As a result, the number of bits required for coding of the coding mode is reduced.

In addition, the positional relationship between the high-resolution block and the object and the coding method for the high-resolution block are decided, and one of the arbitrary-shape coding with reference to the low-resolution image signal, the arbitrary-shape coding without reference to the low-resolution signal, and the fixed-shape coding is performed to the high-resolution image signal according to the decision result. As a result, it is possible to perform hierarchical coding with higher efficiency.

In this embodiment, changing of the coding method for the high-resolution image signal and changing of the coding method for the coding mode of the high-resolution block have been performed according to the coding mode of the low-resolution block. Alternatively, only changing of the coding method for the high-resolution image signal according to the coding mode of the low-resolution block may be performed.

EMBODIMENT 9

Figure 13:
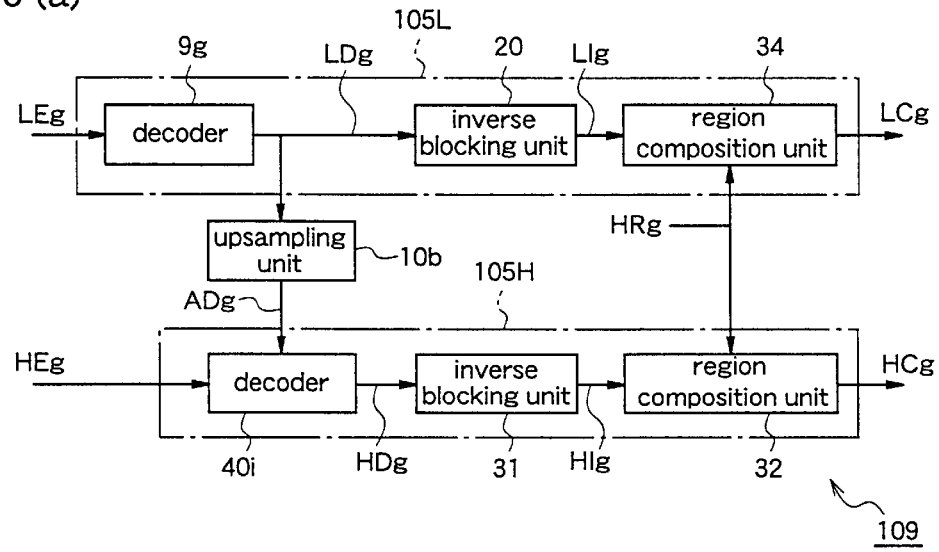
FIGS. 13(a) and 13(b) are block diagrams for explaining a hierarchical image decoding apparatus as an image processing apparatus according to a ninth embodiment of the present invention.
Figure 13:
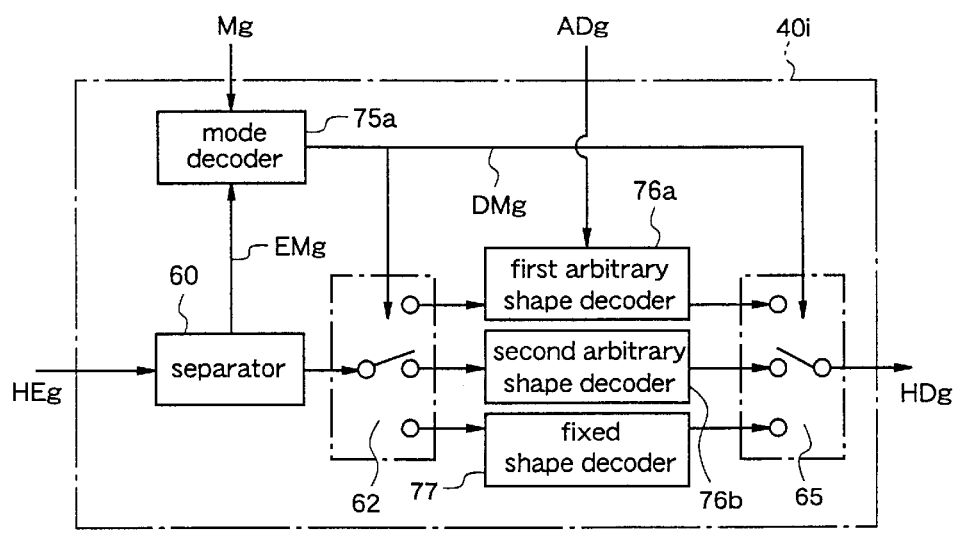

FIGS. 13 is a diagram showing an image processing apparatus (hierarchical image decoding apparatus) according to a ninth embodiment of the present invention, wherein FIG. 13(a) is a block diagram showing a construction of the hierarchical image decoding apparatus and FIG. 13(b) is a block diagram showing detailed construction of a decoder of the hierarchical image decoding apparatus.

Figure 10:
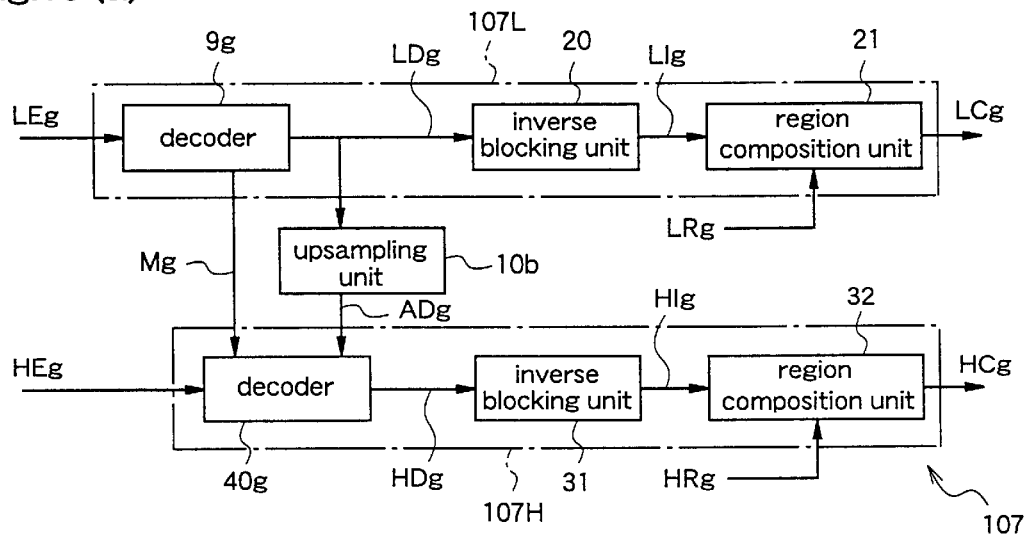
FIGS. 10(a) and 10(b) are block diagrams for explaining a hierarchical image decoding apparatus as an image processing apparatus according to a seventh embodiment of the present invention.
Figure 10:
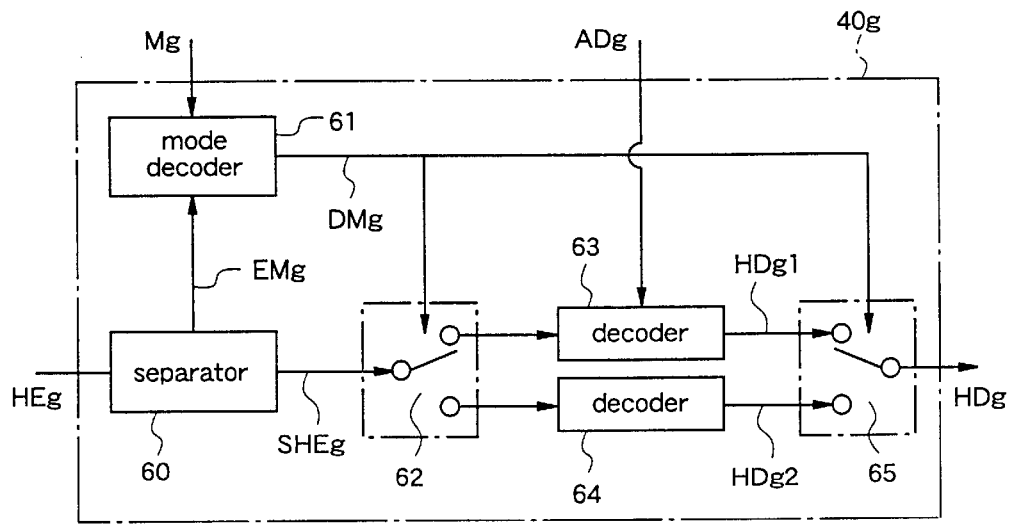

A hierarchical image decoding apparatus 109 of this embodiment is adapted to perform decoding to the low-resolution coded signal and the high-resolution coded signal which have been coded by the hierarchical image coding apparatus 108 of the eighth embodiment shown in FIG. 11, and in the apparatus 109, the decoder 40g of the hierarchical image decoding apparatus 107 of the seventh embodiment in FIG. 10 is replaced by a decoder 40i for changing a decoding method according to a decoded coding mode signals The other components are identical to those of the hierarchical image decoding apparatus 107 of the seventh embodiment.

To be specific, the decoder 40i includes a separator 60 for separating and extracting the coded mode signal EMg from the high-resolution coded signal HEg, a mode decoder 75a for decoding the extracted coded mode signal EMg by referring to the coding mode signal Mg of the low-resolution image signal, first and second arbitrary-shape decoders 76a and 76b of different decoding methods for the high-resolution coded image signal HSg, and a fixed-shape decoder 77. The first arbitrary-shape decoder 76a is used for decoding the high-resolution coded signal by referring to an interpolated signal obtained by upsampling the low-resolution decoded signal, and the second arbitrary-shape decoder 76b is used for decoding the high-resolution coded signal without by referring to the interpolated signal ADg.

The decoder 40i further includes a primary switch 62 for supplying one of the first and second arbitrary-shape decoders 76a and 76b, and the fixed-shape decoder 77 with the high-resolution coded image signal HEg according to the decoded coding mode signal DMg which has been decoded by the mode decoder 75a, and a secondary switch 65 for selecting one of outputs of the first and second decoders 76a and 76b, and the fixed-shape decoder 77 according to the decoded coding mode signal DMg and outputting a high-resolution decoded signal HDg.

Operation and effects will now be described.

The hierarchical image decoding apparatus 109 operates like the hierarchical image decoding apparatus 107 of the seventh embodiment except an operation of the decoder 40I, and therefore only operation of the decoder 40i will be discussed herein.

The mode decoder 75a of the decoder 40i decodes the coded mode signal EMg of the high-resolution image by referring to the coding mode signal Mg of the low-resolution image (indicating inside or outside of an object). The switches 62 and 65 select one of these 3 decoders according to the coding mode of the decoded high-resolution image.

Thereby, an arbitrary-shape coded image signal is decoded by one of the first and second decoders 76a and 76b and a fixed-shape coded image signal is decoded by the decoder 77.

Thus, it is possible to correctly decode the coded signal which has been coded by the hierarchical image coding apparatus of the eighth embodiment according to the shape of the object.

EMBODIMENT 10

Figure 14:
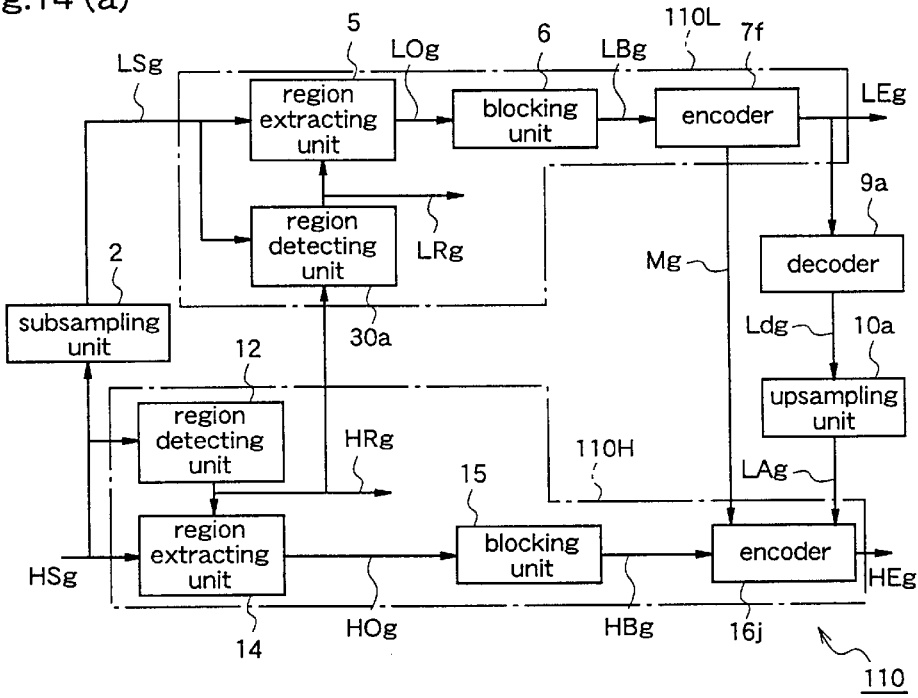
FIGS. 14(a) and 14(b) are block diagrams for explaining a hierarchical image coding apparatus as an image processing apparatus according to a tenth embodiment of the present invention.
Figure 14:
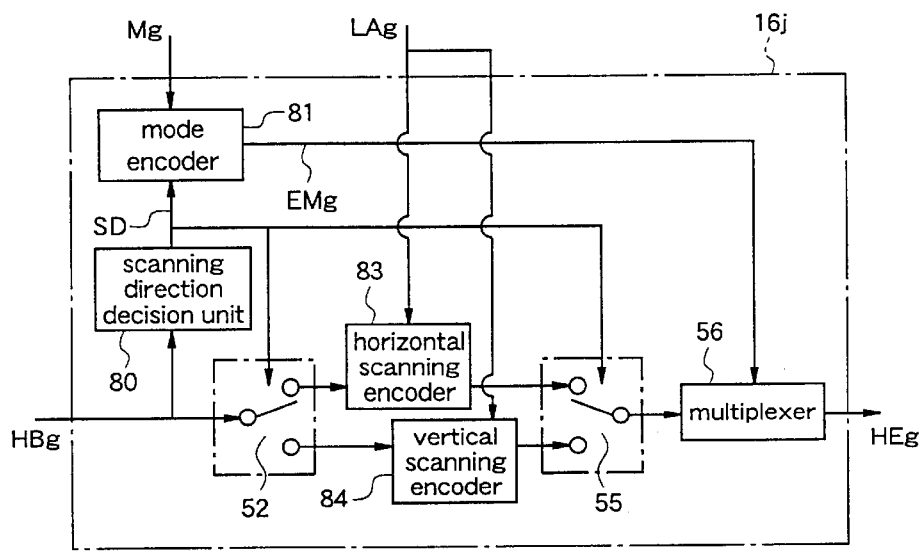

FIGS. 14 is a diagram illustrating an image coding apparatus (hierarchical image coding apparatus) according to a tenth embodiment of the present invention, and FIG. 14(a) is a block diagram illustrating the construction of the hierarchical image coding apparatus, and FIG. 14(b) is a block diagram illustrating the detailed construction of an encoder of the hierarchical image coding apparatus.

In a hierarchical image coding apparatus 110 of the tenth embodiment, the encoder 16f in the hierarchical image coding apparatus 106 of the sixth embodiment shown in FIG. 9 is replaced by an encoder 16j for changing a coding method according to a scanning direction in which a higher correlation between pixel values is obtained. The other components are identical to those of the hierarchical image coding apparatus 106 of the sixth embodiment.

The encoder 16j includes a scanning direction decision unit 80 which receives the blocked high-resolution signal HBg and decides a scanning direction in which a higher correlation between pixel values is obtained in each block, a mode encoder 81 for encoding a signal SD indicating the decision result, according to a mode signal Mg indicating a scanning direction in which a higher correlation between pixel values is obtained for the low-resolution coded signal Leg and outputting a coded mode signal EMg, a horizontal scanning encoder 83 for performing horizontal scanning coding to the high-resolution image signal HSg, and a vertical scanning encoder 84 for performing vertical scanning coding to the high-resolution image signal HSg.

The encoder 16j further includes a primary switch 52 for supplying the high-resolution image signal HSg to one of the horizontal scanning encoder 83 and the vertical scanning encoder 84 according to the output SD of the scanning direction decision unit 80, a secondary switch 55 for selecting the output of one of the horizontal scanning encoder 83 and the vertical scanning encoder 84, according to the output SD of the scanning direction decision unit 80, and a multiplexer 56 for multiplexing the output of the secondary switch 55 and the coded mode signal EMg.

Next, operation and effects will be described.

The hierarchical image coding apparatus of the tenth embodiment, except for the encoder 16j, operates in the same manner as the hierarchical image coding apparatus 106 of the sixth embodiment, and therefore, operation of the operation of the encoder 16j only will be described.

In a coding method in which an image signal is coded in a direction of scan line, coding efficiency varies depending on scanning direction. More specifically, for an image signal in which a higher correlation between pixel values is obtained in the horizontal direction, effective coding using the horizontal correlation between pixel values is possible by sequentially encoding pixel values of respective pixels in the horizontal scanning direction. For an image signal in which a higher correlation between pixel values is obtained in the vertical direction, effective coding using the vertical correlation between pixel values is possible by sequentially encoding pixel values of respective pixels in the vertical scanning direction.

Therefore, in the encoder 16j of the hierarchical image coding apparatus 110 of the tenth embodiment, the scanning direction decision unit 80 decides a scanning direction in which a higher correlation between pixel values is obtained, and according to the decision, one of the horizontal scanning encoder 83 and the vertical scanning encoder 84 is selected by the switches 52 and 55, and the selected encoder encodes the high-resolution image signal. This enables to enhance coding efficiency in the hierarchical coding.

Further, since there is a high correlation between pixel values of a high-resolution image an those of a low-resolution image, there is also a high correlation between a scanning direction in which a higher correlation between pixel values is obtained in a low-resolution image and a scanning direction in which a higher correlation between pixel values is obtained in a high-resolution image.

Hence, in accordance with the tenth embodiment, when the coding mode signal indicating a scanning direction in which a higher correlation between pixel values is obtained in a high-resolution image, which direction has been decided by the scanning direction decision unit 80, is coded by the mode encoder 81 by referring to the coding mode signal Mg indicating a scanning direction in which a higher correlation between pixel values is obtained in a low-resolution image, codes of shorter code length are assigned to the coding mode signal for the high-resolution image signal if a scanning direction in which a higher correlation between pixel values is obtained in a low-resolution image matches a scanning direction in which a higher correlation between pixel values is obtained in a high-resolution image. This enables to further save the number of bits required for coding of the coding mode signal.

EMBODIMENT 11

Figure 15:
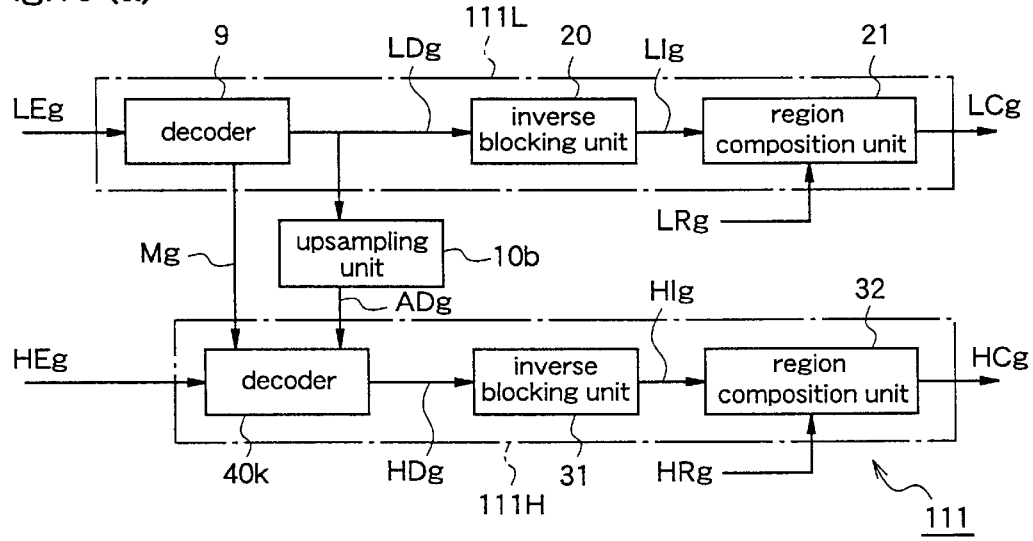
FIGS. 15(a) and 15(b) are block diagrams for explaining a hierarchical image decoding apparatus as an image processing apparatus according to an eleventh embodiment of the present invention.
Figure 15:
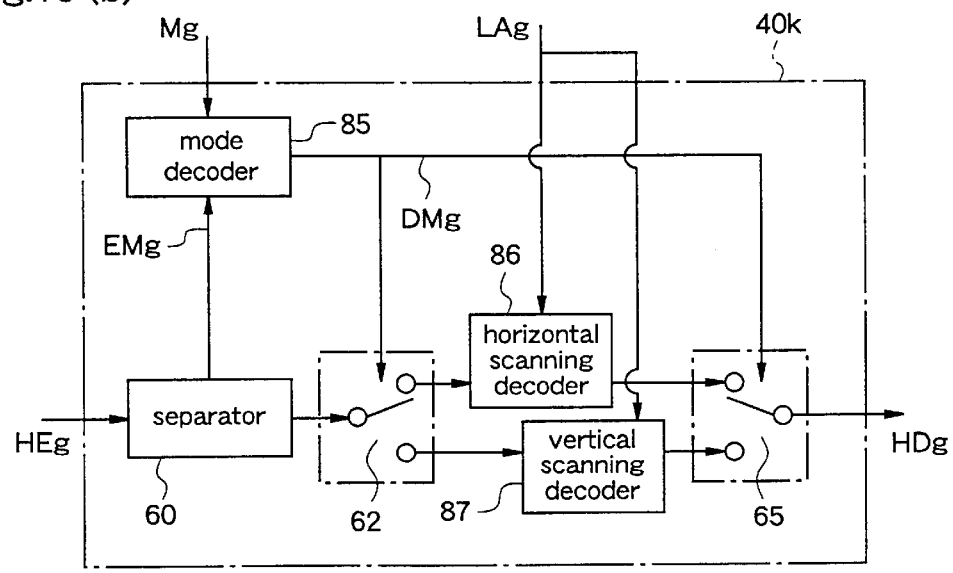

FIGS. 15 is a diagram for explaining an image processing apparatus (hierarchical image decoding apparatus) according to an eleventh embodiment of the present invention. FIG. 15(a) is a block diagram illustrating the construction of this hierarchical image decoding apparatus, and FIG. 15(b) is a block diagram illustrating the detailed construction of a decoder of the hierarchical image decoding apparatus.

A hierarchical image decoding apparatus 111 of the eleventh embodiment is adapted to decode the low-resolution coded signal and high-resolution coded signal which have been coded by the hierarchical image coding apparatus 110 of the tenth embodiment shown in FIG. 14, and in this decoding apparatus, the decoder 40g of the seventh embodiment is replaced by a decoder 40k for changing a decoding method according to a decoded coding mode signal. The other components of the hierarchical image decoding apparatus 100 are identical to those of the hierarchical image decoding apparatus 107 of the seventh embodiment shown in FIG. 10.

The decoder 40k of the eleventh embodiment comprises a separator 60 for separating and extracting a coded mode signal EMg from the high-resolution coded signal HEg, a mode decoder 85 for decoding the extracted coded mode signal EMg, a horizontal scanning decoder 86 for performing horizontal scanning decoding to the high-resolution coded signal HEg, and a vertical scanning decoder 87 for performing vertical scanning decoding to the high-resolution coded signal HEg.

The decoder 40k further comprises a primary switch 62 for supplying the high-resolution coded signal HEg to one of the horizontal scanning decoder 86 and the vertical scanning decoder 87, according to the decoded coding mode signal DMg which has been decoded by the mode decoder 85, and a secondary switch 65 for selecting one of the output of the horizontal scanning decoder 86 and that of the vertical scanning decoder 87 and outputting it as a high-resolution decoded signal HDg.

Next, operation and effects will be described.

The hierarchical image decoding apparatus 111 of the eleventh embodiment, except for the decoder 40k, operates in the same manner as the hierarchical image decoding apparatus 107 of the seventh embodiment, and therefore, only operation of the decoder 40k will be described.

In the decoder 40k, the mode decoder 85 decodes a coded mode signal EMg of a high-resolution image by referring to a coding mode Mg for a low-resolution image (that is, a scanning direction in which a higher correlation between pixel values is obtained). By switching at the switches 62 and 65 according to the decoded coding mode signal DMg (signal indicating a scanning direction in which a higher correlation between pixel values is obtained), the image signal subjected to horizontal scanning coding is decoded by the horizontal scanning decoder 86 and the image signal subjected to vertical scanning coding is decoded by the vertical scanning decoder 87.

Thus, in the eleventh embodiment of the present invention, it is possible to correctly decode the coded signal subjected to either horizontal scanning coding or vertical scanning coding according to a shape of an object.

EMBODIMENT 12

Figure 16:
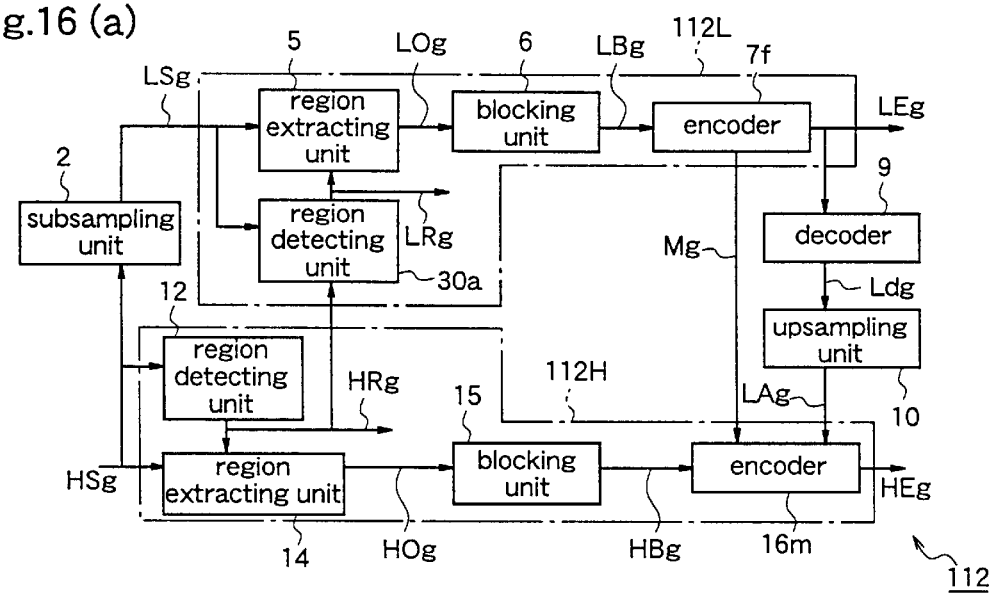
FIGS. 16(a) to 16(c) are block diagrams for explaining a hierarchical image coding apparatus as an image processing apparatus according to a twelfth embodiment of the present invention.
Figure 16:
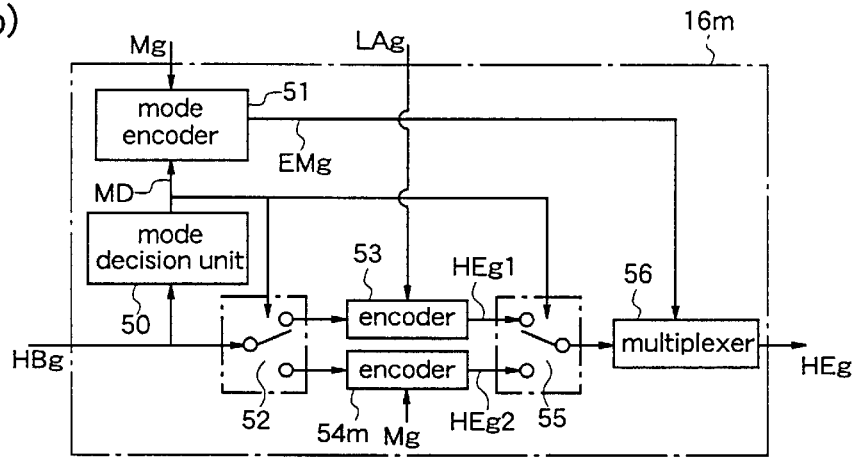
Figure 16:
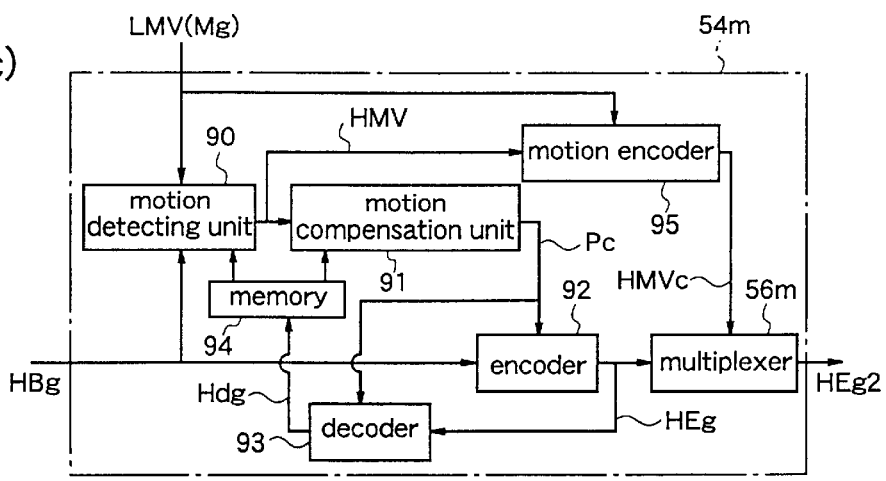

FIGS. 16 is a diagram for explaining an image processing apparatus (hierarchical image coding apparatus) according to a twelfth embodiment of the present invention. FIG. 16(*a*) is a block diagram illustrating the construction of the hierarchical image coding apparatus, FIG. 16(*b*) is a block diagram illustrating the detailed construction of an encoder 16m of the hierarchical image coding apparatus, and FIG. 16(*c*) a block diagram illustrating the detailed construction of a second encoder 54m of the encoder 16m.

In a hierarchical image coding apparatus 112 of the twelfth embodiment, the encoder 16f of the sixth embodiment is replaced by an encoder 16m for encoding the high-resolution image signal by referring to a motion vector of a low-resolution image, and the other components are identical to those of the hierarchical image coding apparatus 106 of the sixth embodiment shown in FIG. 9.

In this encoder 16m, the second encoder 54 of the encoder 16f of the sixth embodiment is adapted to perform interframe prediction coding when required, and the other components are identical to those of the encoder 16f.

More specifically, the second encoder 54m of the encoder 16m in this embodiment comprises an encoder 92 for encoding a high-resolution image signal HBg, based on a prediction signal Pc, and outputting a high-resolution coded signal HEg, a local decoder 93 for decoding the high-resolution coded signal HEg, based on the prediction signal Pc, and outputting a high-resolution locally decoded signal Hdg, and a memory 94 for storing the high-resolution locally decoded signal Hdg. The second encoder 54m further comprises a motion detecting unit 90 which receives the high-resolution image signal HBg and detects the motion vector HMV of the high-resolution image by referring to the high-resolution locally decoded signal Hdg stored in the memory 94 and a motion vector LMV serving as the coding mode Mg for a low-resolution image, a motion compensation unit 91 for reading the prediction signal Pc from the memory 94 based on the motion vector HMV, a motion encoder 95 for encoding the motion vector HMV of the high-resolution image based on the motion vector LMV of the low-resolution image and outputting a coded motion vector signal HMVc, and a multiplexer 56m for multiplexing and outputting the coded motion vector signal HMVc and the high-resolution coded signal HEg.

Next, operation and effects will be described.

The hierarchical image coding apparatus 112 of the twelfth embodiment, except for the encoder 16m, operates in the same manner as the hierarchical image coding apparatus 106 of the sixth embodiment, and therefore, only operation of the encoder 16m will be described.

It is well known that motion compensation for image signals using motion vectors can enhance coding efficiency because of a correlation in a temporal direction, that is, a correlation between the pixel values in a frame and those of a subsequent frame.

In the motion detecting unit 90 of the encoder 16m, the motion vector HMV of the high-resolution image is detected based on the decoded image signal Hdg stored in the memory 94 and the blocked high-resolution image signal HBg, and in the motion compensation unit 91, a motion compensated image (prediction signal) Pc is produced based on the detected motion vector HMV of the high-resolution image.

Then, in the encoder 92, the blocked high-resolution image signal HBg is coded by referring to the motion compensated image Pc. The high-resolution coded signal HEg obtained by this processing is decoded by the decoder 93 and stored in the memory 94 as the high-resolution locally decoded signal Hdg.

Further, since there is a high correlation between pixel values of the high-resolution image and those of the low-resolution image, there is also a correlation between a vector value of the motion vector LMV of the low-resolution image and that of the motion vector HMV of the high-resolution image.

Therefore, in the motion encoder 95, when coding the motion vector HMV of the high-resolution image detected by the motion detecting unit 90 by referring to the coding mode signal Mg of the motion vector LMV of the low-resolution image, a code of sorter length is assigned to the motion vector HMV of the high-resolution image if the motion vector of the high-resolution image matches the motion vector of the low-resolution image. This enables to save the number of bits required for coding the motion vector of the high-resolution image.

EMBODIMENT 13

Figure 17:
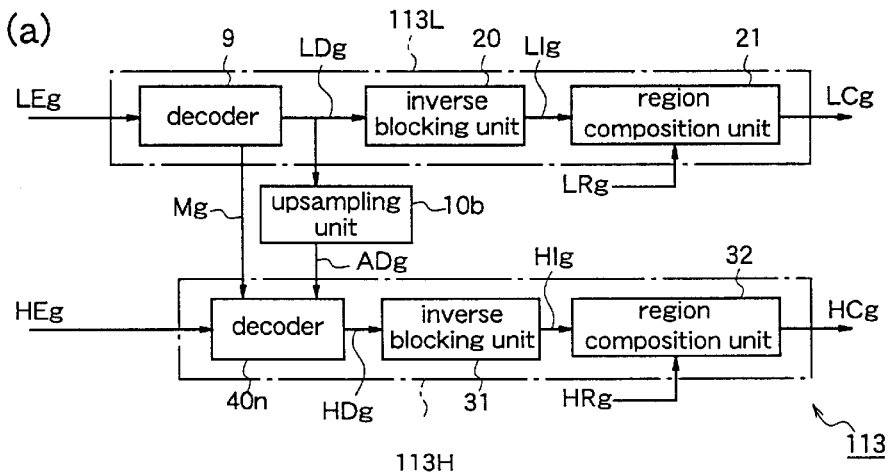
FIGS. 17(a) to 17(c) are block diagrams for explaining a hierarchical image decoding apparatus as an image processing apparatus according to a thirteenth embodiment of the present invention.
Figure 17:
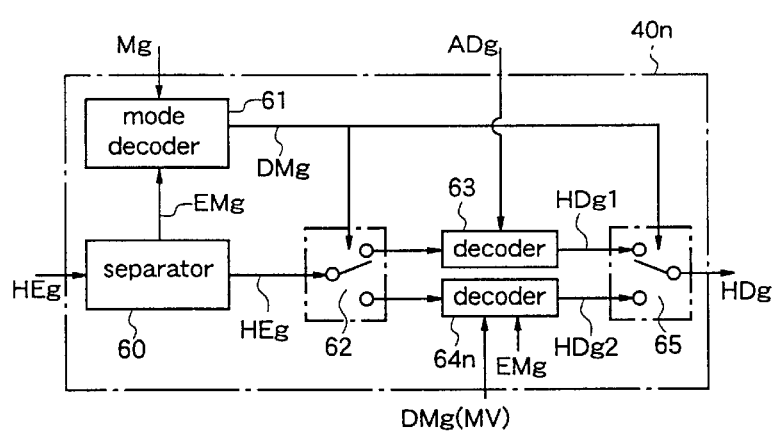
Figure 17:
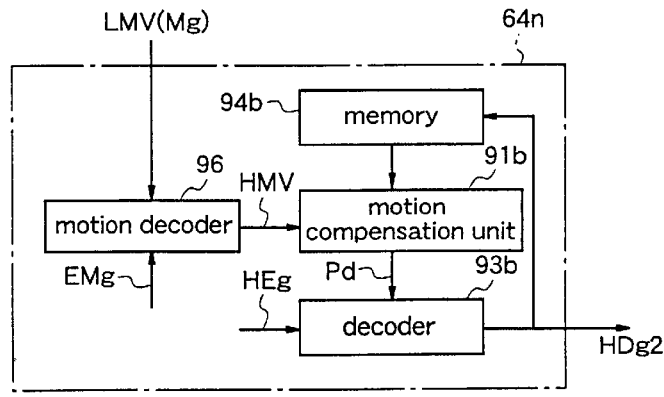

FIGS. 17 is a diagram for explaining an image processing apparatus (a hierarchical image decoding apparatus) according to a thirteenth embodiment of the present invention. FIG. 17(*a*) is a block diagram illustrating the construction of the hierarchical image coding apparatus, FIG. 17(*b*) is a block diagram illustrating the detailed construction of a decoder 40n of the hierarchical image decoding apparatus, and FIG. 17(*c*) is a block diagram illustrating the detailed construction of a second decoder 64n of the decoder 40n.

A hierarchical image decoding apparatus 113 of the thirteenth embodiment is adapted to hierarchically decoding the coded signal which has been coded by the hierarchical image coding apparatus 112 of the twelfth embodiment. In this apparatus, the decoder 40g of the seventh embodiment is replaced by a decoder 40n for decoding a high-resolution coded signal by referring to a motion vector of a low-resolution image. The other components are identical to those of the hierarchical image decoding apparatus 107 of the seventh embodiment shown in FIG. 10.

More specifically, the second decoder 64n of the decoder 40n in this embodiment comprises a decoder 93b for decoding a high-resolution coded signal HEg based on a prediction signal Pd and outputting a high-resolution decoded signal HDg2, and a memory 94b for storing the high-resolution decoded signal HDg2. The second decoder 64n further comprises a motion decoder 96 for decoding a separated coded mode signal EMg by referring to a coding mode for a low-resolution image (motion vector LMV) to reproduce a motion vector HMV of a high-resolution image, and a motion compensation unit 91b for extracting the prediction signal Pd from the high-resolution decoded signal HDg2 stored in the memory 94b based on the reproduced motion vector HMV.

Next, operation and effects will be described.

The hierarchical image decoding apparatus 113 of the thirteenth embodiment, except for the decoder 40n, operates in the same manner as the hierarchical image decoding apparatus 107 of the seventh embodiment, and therefore, only operation of the decoder 40n will be described.

In a separator 60 of the decoder 40n, a code portion corresponding to mode information (motion vector information) EMg is separated from the high-resolution coded signal HEg.

Then, the mode information EMg and the high-resolution coded signal HEg are supplied to the second decoder 64n, where a motion decoder 96 decodes the code of mode information separated by the separator 60 to provide the motion vector HMV of the high-resolution image by referring to the coding mode Mg (motion vector LMV) of the low-resolution image, and supplies the motion vector HMV to the motion compensation unit 91b.

Then, in the motion compensation unit 91b, motion compensation is performed by referring to the decoded high-resolution image signal Pd stored in the memory 94b, and in the decoder 93b, the high-resolution decoded signal HEg other than a portion of the mode information is decoded by referring to the output Pd of the motion compensation unit 91b and the high-resolution decoded signal HDg2 is output. The decoded signal Hdg2 is stored in the memory 94b and referred to when decoding a subsequent block.

Thus, in the thirteenth embodiment, it is possible to correctly decode the high-resolution coded signal HEg which has been coded by referring to the motion vector LMV of the low-resolution image in the hierarchical image coding apparatus 112 of the twelfth embodiment.

EMBODIMENT 14

Figure 18:
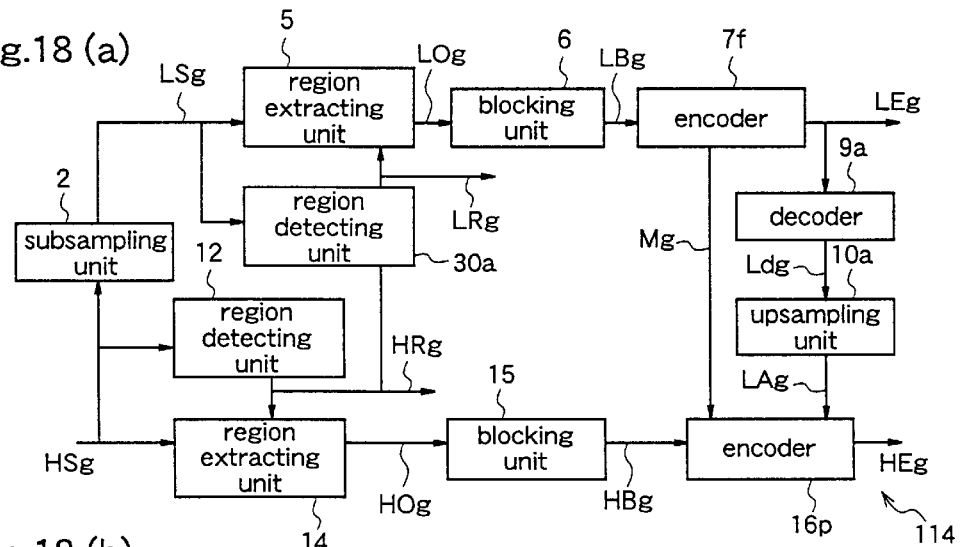
FIGS. 18(a) to 18(c) are block diagrams for explaining a hierarchical image coding apparatus as an image processing apparatus according to a fourteenth embodiment of the present invention.
Figure 18:
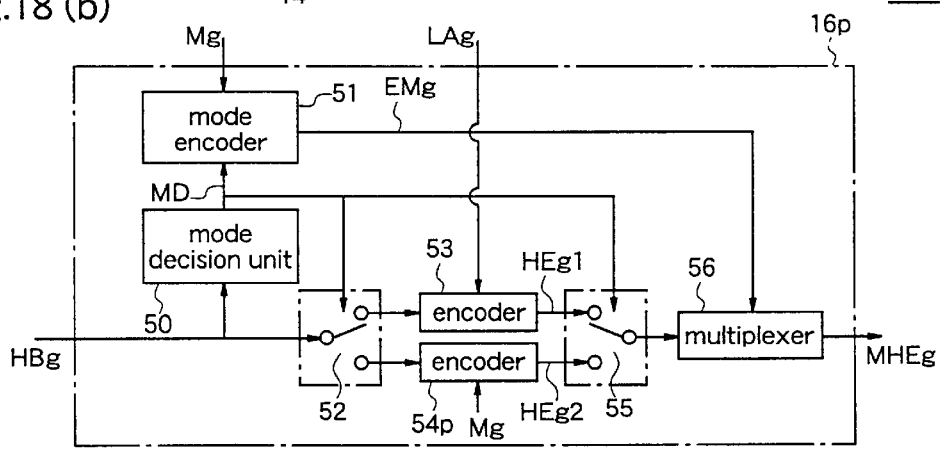
Figure 18:
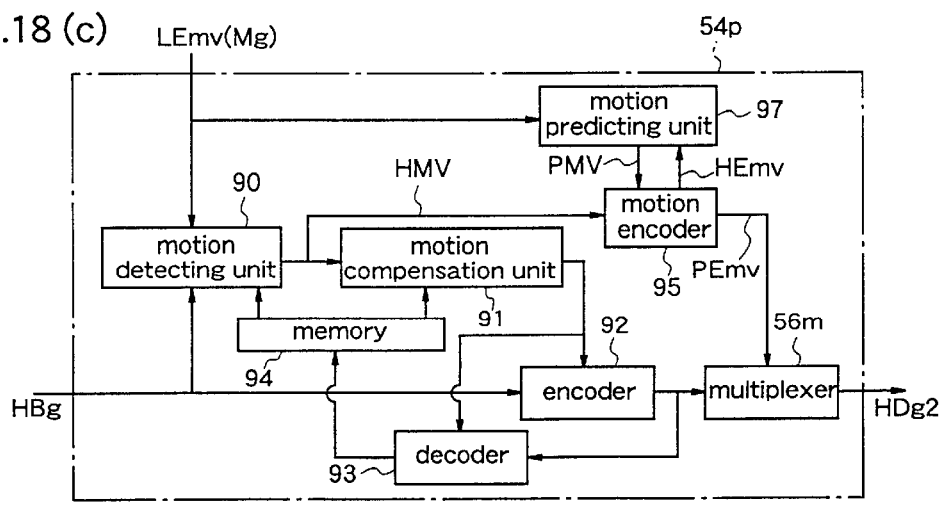

FIGS. 18 is a diagram for explaining an image processing apparatus (hierarchical image coding apparatus) according to a fourteenth embodiment of the present invention. FIG. 18(a) is a block diagram illustrating the construction of this hierarchical image coding apparatus, FIG. 18(b) is a block diagram illustrating the detailed construction of an encoder 16p of the hierarchical image coding apparatus, and FIG. 18(c) is a block diagram illustrating the detailed construction of a second encoder 54p of the encoder 16p.

In a hierarchical image coding apparatus 114 of the fourteenth embodiment, the encoder 16f of the sixteenth embodiment shown in FIG. 9 is replaced by an encoder 16p for encoding a high-resolution image signal by referring to a prediction vector which is predicted from a motion vector of a low-resolution image and that of a coded high-resolution image, and the other components are identical to those of the hierarchical image coding apparatus 106 of the sixth embodiment.

In the encoder 16p, the second encoder 54 included in the encoder 16f of the sixth is adapted to perform inter-frame predictive coding when required, and the other components are identical to those of the encoder 16f.

More specifically, the second encoder 54p of the encoder 16p of the fourteenth embodiment comprises, in addition to the components of the second encoder 54m shown in FIG. 16 of the encoder 16m of the twelfth embodiment, a motion vector prediction unit 97 for producing a prediction motion vector PMV based on a coded motion vector signal of a low-resolution image and a coded motion vector signal of a coded high-resolution image, and the other components are identical to those of the second encoder 54m of the encoder 16m of the twelfth embodiment.

Next, operation and effect will be described.

The second encoder 54p of this fourteenth embodiment differs from the second encoder 54m of the twelfth embodiment in the following respect: the encoder 54m of the twelfth embodiment shown in FIG. 16 encodes the motion vector of the high-resolution image by referring to the motion vector of the low-resolution image, whereas the encoder 54p of the fourteenth embodiment encodes the motion vector of the high-resolution image by referring to the motion vector predicted from the motion vector of the low-resolution image and the motion vector of the coded high-resolution image.

Figure 19:
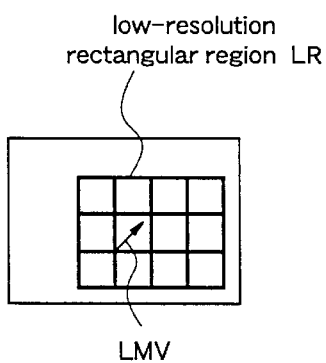
FIGS. 19(a) to 19(d) are diagrams for explaining operation of the hierarchical image coding apparatus of the fourteenth embodiment.
Figure 19:
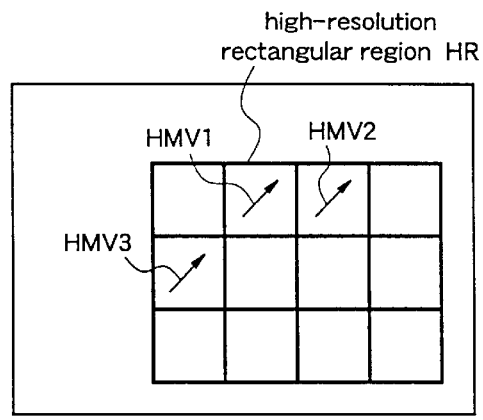
Figure 19:
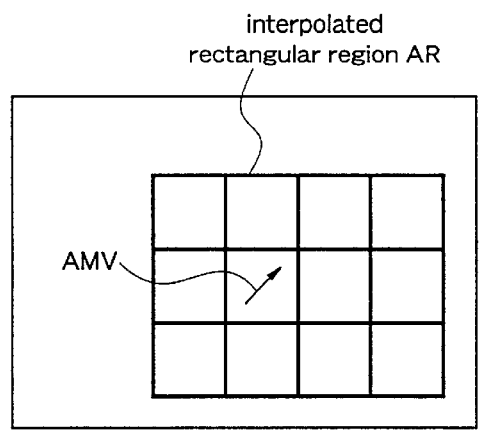
Figure 19:
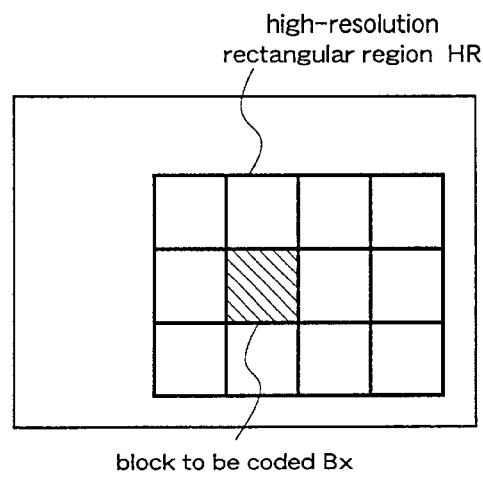

FIGS. 19 is a diagram for explaining the reference to motion vectors. FIG. 19(a) illustrates a motion vector LMV of the low-resolution image, FIG. 19(b) illustrates motion vectors HMV of the high-resolution image, and FIG. 19(c) an interpolated motion vector AMV obtained by resolution-converting the low-resolution image.

To be more detailed, a motion vector of a block to be coded Bx in the high-resolution image shown in FIG. 19(d) is produced by prediction from the interpolated motion vector AMV (see FIG. 19(c)) obtained by the motion vector LMV (see FIG. 19(a)) of the low-resolution image located at the same spatial position and motion vectors HMV1 to HMV3 of the coded high-resolution image (see FIG. 19(b)). This enables to enhance coding efficiency for motion vectors in comparison with the case where the motion vector of the high-resolution image is coded by referring to only the motion vector the low-resolution image located at the same spatial position.

The motion prediction unit 97 refers to coded signals HEmv of the motion vectors HMV (HMV1 to HMV3) of the high-resolution image which have been coded by the motion encoder 95, and a coded signal Mg (LEmv) of the motion vector of the low-resolution image to produce the prediction value PMV of the motion vector of the high-resolution image. The motion encoder 95 refers to the motion vector PMV produced by prediction to encode the motion vector HMV of the high-resolution image detected by a motion detecting unit 90. Then, a coded prediction motion vector PEmv which has been coded by the motion encoder 95 is multiplexed together with a high-resolution coded signal as an output of the encoder 92 by the multiplexer 56m and output as an output HDg2 of the second encoder 54p.

Thus, in accordance with the fourteenth embodiment, since the motion vector of the high-resolution image is coded by referring to the prediction motion vector predicted from motion vector of the low-resolution image and the motion vectors of the high-resolution image, the number of bits required for coding a motion vector of a high-resolution image is further saved in comparison with the twelfth embodiment.

In the twelfth and fourteenth embodiments, when reading a predicted signal (prediction region) for a high-resolution block to be coded from a locally decoded signal stored in the memory 94, a motion vector having a value closest to that of a motion vector of a low-resolution image can be selected. In other words, a prediction region closest to the high-resolution block to be coded is selected, thereby further reducing the number of bits in the motion encoder 95.

In the twelfth and fourteenth embodiments, a coding method for the high-resolution image signal and a coding method for coding mode of the high-resolution image signal are changed according to a coding mode for the low-resolution image. Alternatively, it is possible to change only one of these coding methods according to the coding mode for the low-resolution image.

EMBODIMENT 15

Figure 20:
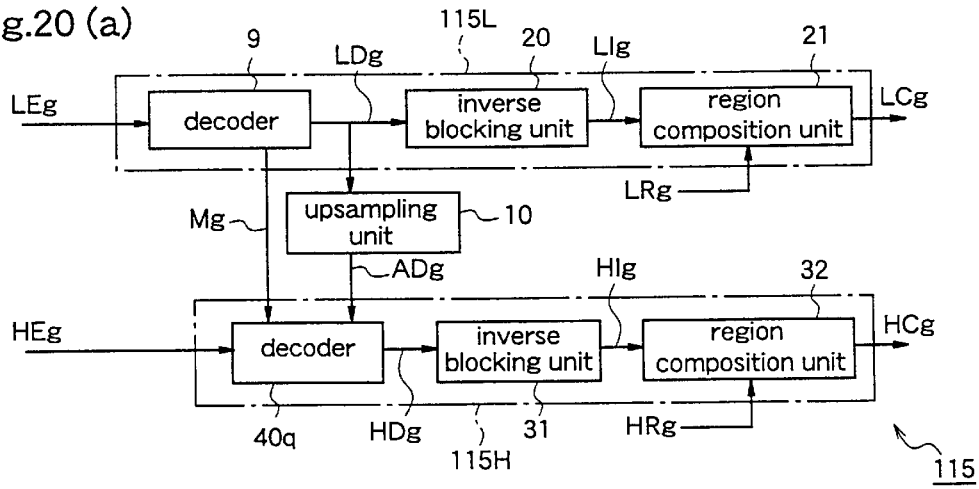
FIGS. 20(a) to 20(c) are block diagrams for explaining a hierarchical image decoding apparatus as an image processing apparatus according to a fifteenth embodiment of the present invention.
Figure 20:
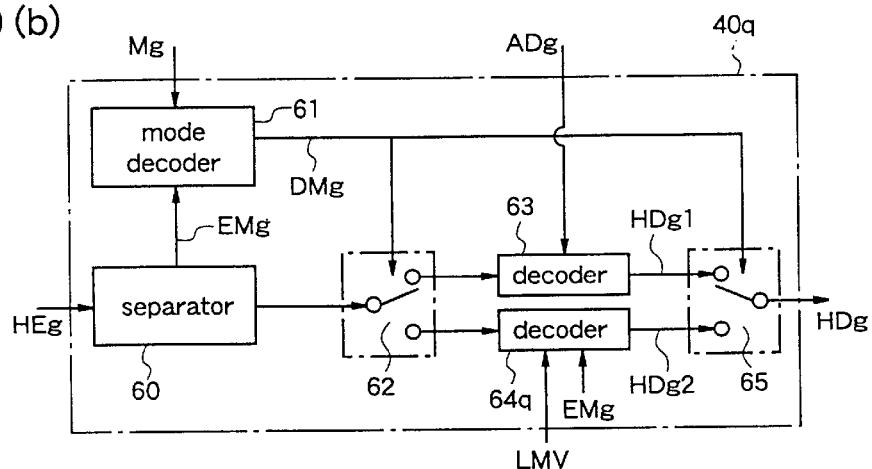
Figure 20:
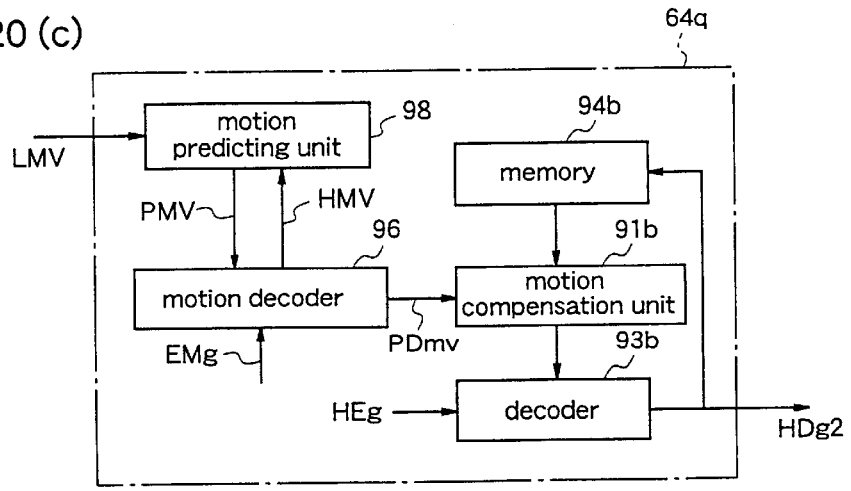

FIG. 20 is a diagram for explaining an image processing apparatus (hierarchical image decoding apparatus) according to a fifteenth embodiment of the present invention. FIG. 20(a) is a block diagram illustrating the construction of the hierarchical image decoding apparatus, FIG. 20(b) is a block diagram illustrating the detailed construction of a decoder 40q of the hierarchical image decoding apparatus, and FIG. 20(c) is a block diagram illustrating the detailed construction of a second decoder 64q of the decoder 40q.

A hierarchical image decoding apparatus 115 of the fifteenth embodiment is adapted to perform hierarchical decoding to the coded signal which has been coded by the hierarchical image coding apparatus 114 of the fourteenth embodiment shown in FIG. 18. In this hierarchical image decoding apparatus 115, the decoder 40g of the seventh embodiment shown in FIG. 10 is replaced by a decoder 40q for decoding a high-resolution image signal by referring to a prediction vector predicted from a motion vector of a low-resolution image and a motion vector of a coded high-resolution image, and the other components are identical to those of the hierarchical image decoding apparatus 107 of the seventh embodiment.

In this decoder 40q, the second decoder 64 included in the decoder 40g of the seventh embodiment is adapted to perform inter-frame prediction coding when required, and the other components are identical to those of the decoder 40g.

More specifically, a second decoder 64q of the decoder 40q of this embodiment comprises, in addition to the components of the second decoder 64n of the thirteenth embodiment shown in FIG. 17, a motion vector prediction unit 98 for producing a prediction motion vector PMV based on a motion vector LMV of a low-resolution image and a motion vector HMV of a coded high-resolution image, and the other components are identical to those of the second decoder 64n of the thirteenth embodiment.

Next, operation and effect will be described.

The hierarchical image decoding apparatus 115 of the fifteenth embodiment, except for the second decoder 64q of the decoder 40q, operates in the same manner as the hierarchical image decoding apparatus 113 of the thirteenth embodiment, and therefore, a description is given only of the operation of the second decoder 64q included in the decoder 40q.

A motion prediction unit 98 of the second decoder 64q refers to the motion vector HMV of the high-resolution image decoded by a motion decoder 96 and the motion vector LMV of the low-resolution image (DMg) supplied by a mode decoder 61 to produce a prediction value of the motion vector of a high-resolution image block. Then, the motion decoder 96 decodes a coded motion vector signal EMg of a high-resolution image by referring to the motion vector PMV produced by prediction. The other components operate in the same manner as in the hierarchical image decoding apparatus 113 of the thirteenth embodiment shown in FIG. 17.

Thus, in the fifteenth embodiment, the coded motion vector signal which has been coded, can be correctly decoded by referring to the coded motion vector of the high-resolution image and the motion vector of the low-resolution image.

Furthermore, when coding and decoding programs for implementing image coding and decoding processes shown in the respective embodiments are recorded in a data recording medium such as a floppy disc and the like, the processing described in the respective embodiments can be easily performed in an independent computer system.

Figure 21:
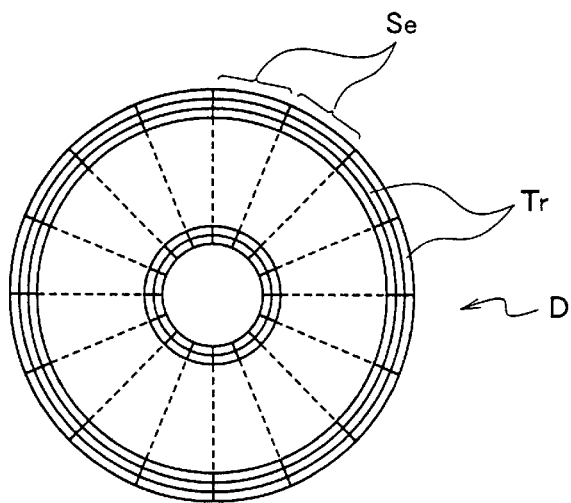
FIGS. 21(a) to 21(c) are diagrams illustrating a data recording medium which contains programs for implementing the hierarchical coding or hierarchical decoding performed by the image processing apparatuses of the respective embodiments.
Figure 21:
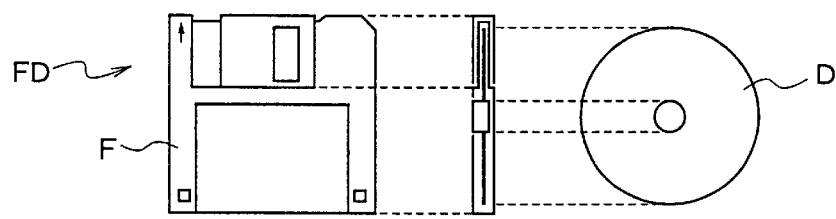
Figure 21:
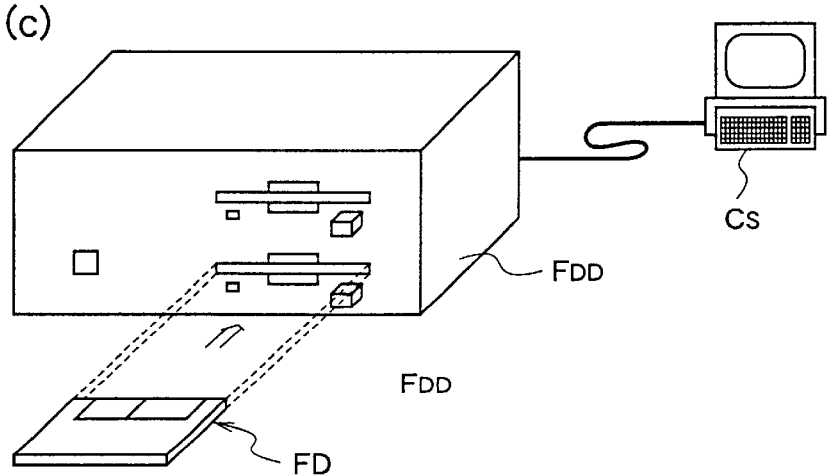
Figure 22:
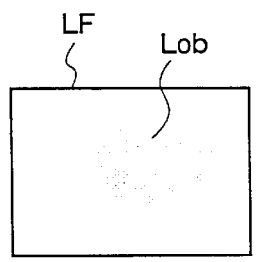
FIG. 22 is a diagram for explaining a prior art hierarchical image coding apparatus.
Figure 22:
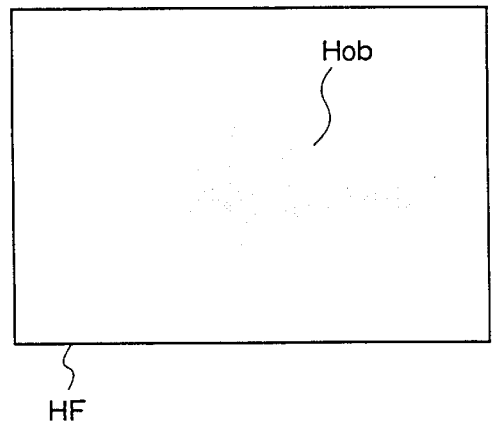
Figure 22:
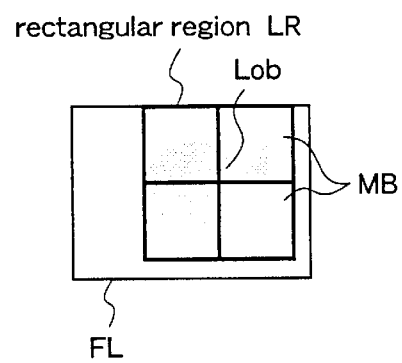
Figure 22:
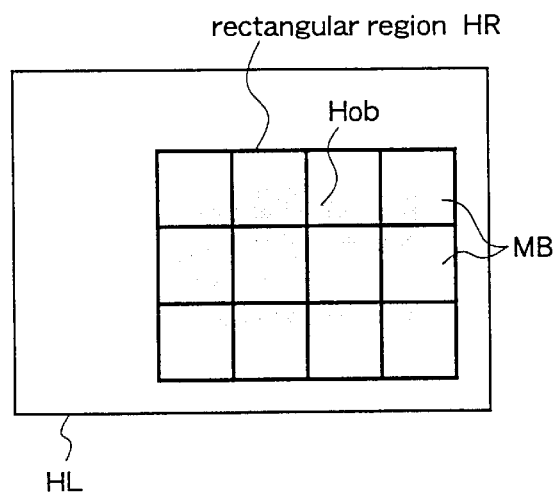
Figure 23:
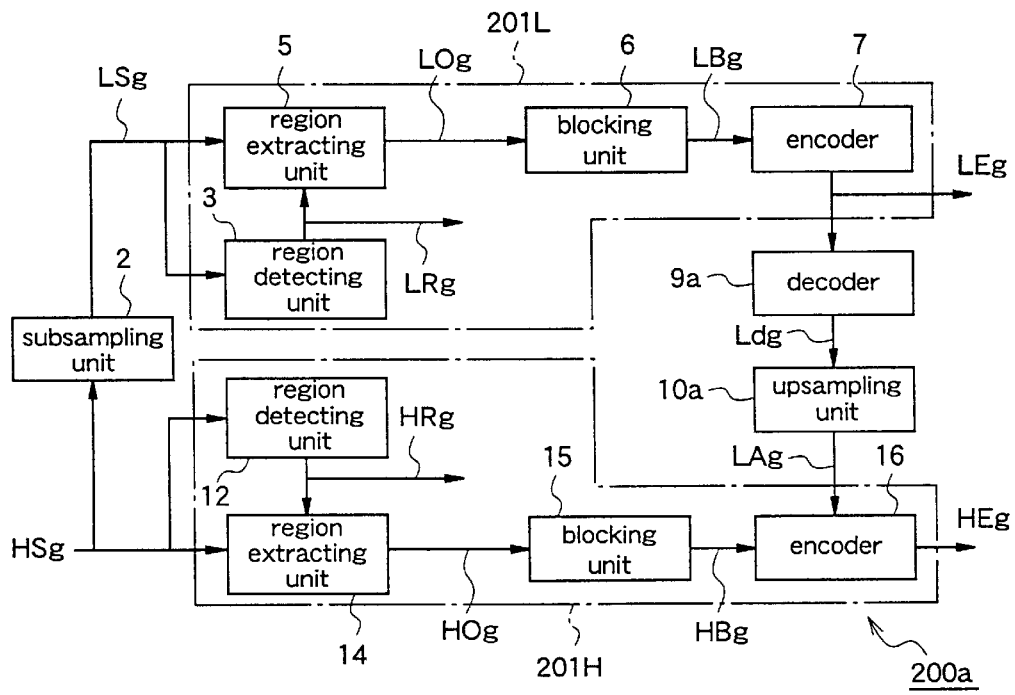
FIG. 23 is a block diagram for explaining a hierarchical image coding apparatus as a prior art image processing apparatus.

FIGS. 21 is a diagram for explaining a case where the hierarchical image coding process or the hierarchical image decoding process performed by the image processing apparatus of the respective embodiments are implemented in a computer system by using a floppy disk for storing the programs of these image processing.

FIG. 21(b) illustrates the front appearance and a cross-section of a floppy disk FD, and a floppy disk body D as a recording medium, and FIG. 21(a) illustrates an example of a physical format of the disk body D. The disk body D is stored in a case F, and in a surface of the disk body D, a plurality of tracks Tr are formed concentrically from outer to inner radius thereof, each track being divided into 16 sectors Se in an angle direction. In the floppy disk body D for storing the program, the data of the programs are recorded in the regions assigned on the floppy disk body D.

Further, FIG. 21(c) shows a construction for recording and reproducing the program using the floppy disk FD. When recording the programs into the floppy disk FD, the data of the program is written from a computer system Cs into the floppy disk FD by means of a floppy disk drive FDD. When constructing the above-described decoding method in the computer system Cs using the program stored in the floppy disk FD, the program is read from the floppy disk FD by means of the floppy disk drive FDD and transmitted to the computer system Cs.

While the above description is given of image processing in the computer system using the floppy disc as the data recording medium, the image processing may be performed likewise using an optical disc. In addition, the recording medium is not limited thereto, and an ID card, an ROM cassette, and the like may be employed as long as it can record the program.

In the encoders of the sixth, eighth, and tenth embodiments, the mode decision unit 50 (see FIG. 9(b)), the boundary decision unit 70 (see FIG. 11(b)), and the scanning direction decision unit 80 (see FIG. 14(b)) are adapted to decide a coding method based on high-resolution image signals input externally before the coding process. Alternatively, these decision units may decide the coding method, that is, a coding mode, according to comparison among coded signals coded by plural coding methods.

Industrial Availability

As described above, since the image processing methods, image processing apparatuses, and data recording medium according to the present invention, enable to enhance coding efficiency in compression process for image signals, and are thus quite useful in implementing image coding and decoding processes in a system where image signals are transmitted or stored, they are suitable for compression and decompression processes for moving pictures according to a standard such as MPEG4.

What is claimed is:

1. An image processing method for hierarchically coding an input image signal including shape information of an object, object by object which is included in an image, said method comprising:

producing at least a low-resolution image signal and a high-resolution image signal as hierarchical image signals corresponding to the object, forming plural image spaces of different spatial resolutions, based on the input image signal;

extracting a high-resolution region image signal, corresponding to a region including the object which is to be coded in a high-resolution image space, from the high-resolution image signal corresponding to the object, dividing the region image signal into image signals respectively corresponding to high-resolution blocks each comprising a predetermined number of pixels, extracting a low-resolution region image signal, corresponding to a region including the object which is to be coded in a low-resolution image space, from the low-resolution image signal corresponding to the object, and dividing the region image signal into image signals respectively corresponding to low-resolution blocks each comprising a predetermined number of pixels; and sequentially coding a high-resolution blocked image signal forming a target high-resolution block to be coded by referring to a low-resolution blocked image signal forming a reference low-resolution block corresponding to the target high-resolution block, wherein a spatial position of the reference low-resolution block in the low-resolution image space corresponds to a spatial position of the target high-resolution block in the high-resolution image space according to a predetermined rule.

2. The image processing method of claim 1, wherein each pixel in the high-resolution image space has a one-to-one correspondence with each pixel in a resolution-converted image space in which the low-resolution image space has been resolution-converted, the resolution-converted image space having the same spatial resolution as the high-resolution image space.

3. The image processing method of claim 1, wherein the number of pixels in the reference low-resolution block is equal to the number of pixels in the target high-resolution block.

4. The image processing method of claim 1, wherein a coding method for a mode signal indicating a coding mode for identifying the coding process for the target high-resolution block is changed according to a coding mode for identifying a coding process for the reference low-resolution block.

5. The image processing method of claim 4, wherein the coding mode indicates whether or not a boundary of a shape of an object displayed on an image space is included in the target high-resolution block.

6. A data recording medium for storing a program which makes a computer perform a hierarchical image coding process, the program operable to make the computer perform a hierarchical image coding process according to an image processing method of claim 1.

7. The image processing method of claim 1, wherein the spatial position of the reference low-resolution block in the low-resolution image space relatively matches the spatial position of the target high-resolution block in the high-resolution image space.

8. The image processing method of claim 1, wherein a mode signal indicating a coding mode for identifying a coding process for the target high-resolution block is coded according to a coding mode for identifying a coding process for the reference low-resolution block, and the coding mode indicates that the coding process sequentially performed to the image signal of the reference low-resolution block for each pixel is performed in either a horizontal or vertical scanning direction.

9. The image processing method of claim 1, wherein motion information of the target high-resolution block indicating motion of an object in the high-resolution image space is coded by referring to motion information of the reference low-resolution block indicating motion of an object in the low-resolution image space.

10. The image processing method of claim 1, wherein motion information of the target high-resolution block indicating motion of an object in the high-resolution image space is coded by referring to motion information of a coded high-resolution block indicating motion of an object in the high-resolution image space and motion information of the reference low-resolution block indicating motion of an object in the low-resolution image space.

11. An image processing method for decoding at least two blocked and hierarchically coded signals corresponding to an object which are obtained by hierarchically coding an input image signal including shape information of the object, object by object which is included in an image, said method comprising:

decoding a low-resolution coded signal corresponding to the object of the blocked and hierarchically coded signals to produce low-resolution decoded signals of low-resolution blocks each comprising a predetermined number of pixels in a low-resolution image space;

integrating the low-resolution decoded signals to produce a low-resolution region image signal corresponding to a region including the object in the low-resolution image space;

decoding a high-resolution coded signal corresponding to the object of the blocked and hierarchically coded signals by referring to a reference low-resolution decoded signal to produce high-resolution decoded signals of high-resolution blocks each comprising a predetermined number of pixels in a high-resolution image space; and integrating the high-resolution decoded signals to produce a high-resolution region image signal corresponding to a region including the object in the high-resolution image space, wherein a spatial position of the reference low-resolution block in the low-resolution image space relatively corresponds to a spatial position of a target high-resolution block to be decoded in the high-resolution image space according to a predetermined rule.

12. The image processing method of claim 11, wherein each pixel in the high-resolution image space has a one-to-one correspondence with each pixel in a resolution-converted image space in which the low-resolution image space has been resolution-converted, the resolution-converted image space having the same spatial resolution as the high-resolution image space.

13. The image processing method of claim 11, wherein the number of pixels in the reference low-resolution block is equal to the number of pixels in the target high-resolution block.

14. The image processing method of claim 11, wherein a decoding method for a coded mode signal indicating a coding mode for identifying a decoding process for the target high-resolution block is changed according to a coding mode for identifying a decoding process for the reference low-resolution block.

15. A data recording medium for storing a program which makes a computer perform a hierarchical image decoding process, the program operable to make the computer perform a hierarchical image decoding process according to an image processing method of claim 11.

16. The image processing method of claim 11, wherein the spatial position of the reference low-resolution block in the low-resolution image space relatively matches the spatial position of the target high-resolution block in the high-resolution image space.

17. The image processing method of claim 11, wherein a coded mode signal indicating a coding mode for identifying a decoding process for the target high-resolution block is decoded according to a coding mode for identifying a decoding process for the reference low-resolution block, and the coding mode indicates whether or not a boundary of a shape of an object displayed on an image space is included in the target high-resolution block.

18. The image processing method of claim 11, wherein a coded mode signal indicating a coding mode for identifying a decoding process for the target high-resolution block is decoded according to a coding mode for identifying a decoding process for the reference low-resolution block, and the coding mode indicates that the decoding process sequentially performed to the low-resolution coded signal of the reference low-resolution block for each pixel is performed in either a horizontal or vertical scanning direction.

19. The image processing method of claim 16, wherein motion information of the target high-resolution block indicating motion of an object in the high-resolution image space is decoded according to motion information of the reference low-resolution block indicating motion of an object in the low-resolution image space.

20. The image processing method of claim 11, wherein motion information of the target high-resolution block indicating motion of an object in the high-resolution image space is decoded according to motion information of a decoded high-resolution block indicating motion of an object in the high-resolution image space and motion information of the reference low-resolution block indicating motion of an object in the low-resolution image space.

21. An image processing apparatus for hierarchically coding an input image signal including shape information of an object, object by object which is included in an image, said apparatus comprising:

a subsampling means for subsampling the input image signal to produce a low-resolution image signal;

a first region extraction means for producing a low-resolution region image signal, corresponding to a region including the object which is to be coded in the low-resolution image space, from the low-resolution image signal;

a first blocking means for performing a blocking process in such a way that the low-resolution region image signal is divided into signals respectively corresponding to low-resolution blocks each comprising a predetermined number of pixels and outputting low-resolution blocked image signals;

a first encoding means for sequentially coding a low-resolution blocked image signal forming a low-resolution block to be coded;

a second region extraction means for producing a high-resolution region image signal, corresponding to a region including the object which is to be coded in the high-resolution image space, from the high-resolution image signal as the input image signal;

a second blocking means for performing a blocking process in such a way that the high-resolution region image signal is divided into signals respectively corresponding to high-resolution blocks each comprising a predetermined number of pixels and outputting high-resolution blocked image signals; and a second encoding means for sequentially coding a high-resolution blocked image signal forming a target high-resolution block to be coded by referring to a low-resolution blocked image signal forming a reference low-resolution block corresponding to the target high-resolution block;

wherein a spatial position of the reference low-resolution block in the low-resolution image space relatively corresponds to a spatial position of the target high-resolution block in the high-resolution image space according to a predetermined rule.

22. An image processing apparatus for decoding at least two blocked and hierarchically coded signals corresponding to an object which are obtained by hierarchically coding an input image signal including shape information of the object, object by object which is included in an image, said apparatus comprising:

a first decoding means for decoding a low-resolution coded signal corresponding to the object of the blocked and hierarchically coded signals to produce low-resolution decoded signals of low-resolution blocks each comprising a predetermined number of pixels in a low-resolution image space;

a first inverse blocking means for integrating the low-resolution decoded signals of the low-resolution blocks to produce a low-resolution region image signal corresponding to a region including the object in the low-resolution image space;

a second decoding means for decoding a high-resolution coded signal corresponding to the object of the blocked and hierarchically coded signals, by referring to a reference low-resolution decoded signal, to produce high-resolution decoded signals of high-resolution blocks each comprising a predetermined number of pixels in a high-resolution image space; and a second inverse blocking means for integrating the high-resolution decoded signals of the high-resolution blocks to produce a high-resolution region image signal corresponding to a region including the object in the high-resolution image space;

wherein a spatial position of the reference low-resolution block in the low-resolution image space relatively corresponds to a spatial position of the target high-resolution block in the high-resolution image space according to a predetermined rule.

23. An image processing apparatus for hierarchically coding an input image signal including shape information of an object, object by object which is included in an image, said apparatus comprising:

a subsampling device operable to subsample the input image signal to produce a low-resolution image signal;

a first region extraction device operable to produce a low-resolution region image signal, corresponding to a region including the object which is to be coded in the low-resolution image space, from the low-resolution image signal;

a first blocking device operable to perform a blocking process in such a way that the low-resolution region image signal is divided into signals respectively corresponding to low-resolution blocks each comprising a predetermined number of pixels and output low-resolution blocked image signals;

a first encoding device operable to sequentially code a low-resolution blocked image signal forming a low-resolution block to be coded;

a second region extraction device operable to produce a high-resolution region image signal, corresponding to a region including the object which is to be coded in the high-resolution image space, from the high-resolution image signal as the input image signal;

a second blocking device operable to perform a blocking process in such a way that the high-resolution region image signal is divided into signals respectively corresponding to high-resolution blocks each comprising a predetermined number of pixels and output high-resolution blocked image signals; and a second encoding device operable to sequentially code a high-resolution blocked image signal forming a target high-resolution block to be coded by referring to a low-resolution blocked image signal forming a reference low-resolution block corresponding to the target high-resolution block;

wherein a spatial position of the reference low-resolution block in the low-resolution image space relatively corresponds to a spatial position of the target high-resolution block in the high-resolution image space according to a predetermined rule.

24. An image processing apparatus for decoding at least two blocked and hierarchically coded signals corresponding to an object which are obtained by hierarchically coding an input image signal including shape information of the object, object by object which is included in an image, said apparatus comprising:

a first decoding device operable to decode a low-resolution coded signal corresponding to the object of the blocked and hierarchically coded signals to produce low-resolution decoded signals of low-resolution blocks each comprising a predetermined number of pixels in a low-resolution image space;

a first inverse blocking device operable to integrate the low-resolution decoded signals of the low-resolution blocks to produce a low-resolution region image signal corresponding to a region including the object in the low-resolution image space;

a second decoding device operable to decode a high-resolution coded signal corresponding to the object of the blocked and hierarchically coded signals, by referring to a reference low-resolution decoded signal, to produce high-resolution decoded signals of high-resolution blocks each comprising a predetermined number of pixels in a high-resolution image space; and a second inverse blocking device operable to integrate the high-resolution decoded signals of the high-resolution blocks to produce a high-resolution region image signal corresponding to a region including the object in the high-resolution image space;

wherein a spatial position of the reference low-resolution block in the low-resolution image space relatively corresponds to a spatial position of the target high-resolution block in the high-resolution image space according to a predetermined rule.

* * * * *